US012301729B2

(12) United States Patent
Mestery et al.

(10) Patent No.: US 12,301,729 B2
(45) Date of Patent: May 13, 2025

(54) CENTRALIZED CONSENT VENDORS FOR MANAGING NETWORK-BASED CONSENT CONTRACTS

(71) Applicant: Cisco Technology, Inc., San Jose, CA (US)

(72) Inventors: Kyle Andrew Donald Mestery, Woodbury, MN (US); Ian James Wells, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 49 days.

(21) Appl. No.: 17/183,825

(22) Filed: Feb. 24, 2021

(65) Prior Publication Data

US 2022/0271947 A1     Aug. 25, 2022

(51) Int. Cl.
*H04L 29/06* (2006.01)
*H04L 9/32* (2006.01)
*H04L 9/40* (2022.01)
*H04L 61/4511* (2022.01)

(52) U.S. Cl.
CPC ........ *H04L 9/3263* (2013.01); *H04L 61/4511* (2022.05); *H04L 63/101* (2013.01)

(58) Field of Classification Search
CPC ... H04L 9/3263; H04L 61/4511; H04L 63/101
USPC .......................................................... 726/10
See application file for complete search history.

(56) References Cited

U.S. PATENT DOCUMENTS

| 9,027,136 | B2 | 5/2015 | Be'Ery et al. |
| 9,934,544 | B1 | 4/2018 | Whitfield et al. |
| 10,153,907 | B2 | 12/2018 | Xu et al. |
| 10,565,666 | B2 * | 2/2020 | Veeramachaneni ......... G06Q 50/184 |
| 10,644,889 | B1 | 5/2020 | Govindaraj et al. |
| 10,834,141 | B1 | 11/2020 | Chud |
| 2002/0069278 | A1 | 6/2002 | Forslöw |

(Continued)

FOREIGN PATENT DOCUMENTS

| EP | 2556646 A1 | 2/2013 |
| JP | 202074188 A | 5/2020 |
| WO | WO2019153095 A1 | 8/2019 |

OTHER PUBLICATIONS

Enck, "TaintDroid: An Information-Flow Tracking System for Realtime Privacy Monitoring on Smartphones", Jun. 2014, ACM, vol. 32, pp. 1-25 (Year: 2014).*

(Continued)

*Primary Examiner* — Taghi T Arani
*Assistant Examiner* — Gregory A Lane
(74) *Attorney, Agent, or Firm* — Lee & Hayes, P.C.

(57) ABSTRACT

Techniques for creating consent contracts for devices that indicate whether the devices consent to receiving network-based communications from other devices. Further, the techniques include enforcing the consent contracts such that network-based communications are either allowed or disallowed in the network-communications layer prior to the network communications reaching the devices. Rather than simply allowing a device to communicate with any other device over a network, the techniques described herein include building in consent for network-based communications where the consent is consulted at one or more points in a communication process to make informed decisions about network-based traffic.

9 Claims, 13 Drawing Sheets

(56) References Cited

U.S. PATENT DOCUMENTS

| | | | |
|---|---|---|---|
| 2002/0120866 A1* | 8/2002 | Mitchell | G06F 21/31 |
| | | | 726/4 |
| 2002/0188656 A1 | 12/2002 | Patton et al. | |
| 2004/0088550 A1* | 5/2004 | Maste | H04W 12/08 |
| | | | 713/182 |
| 2005/0132060 A1 | 6/2005 | Mo et al. | |
| 2007/0038765 A1 | 2/2007 | Dunn | |
| 2008/0222307 A1* | 9/2008 | Bhakta | H04L 61/45 |
| | | | 709/245 |
| 2009/0147684 A1* | 6/2009 | Majidi-Ahy | H04L 12/66 |
| | | | 370/469 |
| 2009/0172138 A1* | 7/2009 | Wang | H04L 61/4547 |
| | | | 709/223 |
| 2010/0217856 A1* | 8/2010 | Falkena | H04L 61/30 |
| | | | 709/227 |
| 2011/0072137 A1 | 3/2011 | de oca et al. | |
| 2012/0151557 A1 | 6/2012 | Ahmed et al. | |
| 2012/0185578 A1 | 7/2012 | Perkuhn et al. | |
| 2012/0331530 A1 | 12/2012 | Chickering et al. | |
| 2013/0151386 A1* | 6/2013 | Malaviya | H04W 12/06 |
| | | | 705/1.1 |
| 2013/0174223 A1 | 7/2013 | Dykeman et al. | |
| 2014/0096207 A1 | 4/2014 | Gilbert et al. | |
| 2014/0136267 A1 | 5/2014 | Ristock | |
| 2014/0281503 A1* | 9/2014 | Mills | H04L 9/3268 |
| | | | 713/157 |
| 2014/0351368 A1 | 11/2014 | Dudziak et al. | |
| 2015/0067814 A1 | 3/2015 | Bu | |
| 2015/0188887 A1 | 7/2015 | Thomas et al. | |
| 2015/0264040 A1* | 9/2015 | Schneider | H04L 9/3265 |
| | | | 726/10 |
| 2015/0304448 A1 | 10/2015 | Mathew et al. | |
| 2016/0006685 A1* | 1/2016 | Kitamuya | H04L 61/4511 |
| | | | 709/238 |
| 2016/0112208 A1 | 4/2016 | Williams et al. | |
| 2016/0191243 A1* | 6/2016 | Manning | H04L 61/4511 |
| | | | 713/168 |
| 2016/0197935 A1 | 7/2016 | Jamison et al. | |
| 2016/0226859 A1 | 8/2016 | Sondhi et al. | |
| 2016/0330287 A1* | 11/2016 | Smith | H04L 61/4511 |
| 2017/0063557 A1* | 3/2017 | Chalmandrier-Perna | |
| | | | H04L 63/0245 |
| 2017/0063935 A1 | 3/2017 | Lim | |
| 2018/0007178 A1 | 1/2018 | Subhraveti | |
| 2018/0013793 A1* | 1/2018 | Belamaric | H04L 63/20 |
| 2018/0247385 A1 | 8/2018 | Whitfield et al. | |
| 2019/0005210 A1 | 1/2019 | Wiederspohn et al. | |
| 2019/0052994 A1 | 2/2019 | Dar | |
| 2019/0114630 A1 | 4/2019 | Torkelson et al. | |
| 2019/0188411 A1 | 6/2019 | Kroutik | |
| 2019/0297114 A1* | 9/2019 | Panchalingam | H04L 41/0893 |
| 2019/0349402 A1 | 11/2019 | Shukla et al. | |
| 2019/0392171 A1 | 12/2019 | Barday et al. | |
| 2020/0042625 A1 | 2/2020 | Balaraman et al. | |
| 2020/0059786 A1* | 2/2020 | Farag | H04W 12/037 |
| 2020/0228486 A1 | 7/2020 | Park et al. | |
| 2020/0250295 A1 | 8/2020 | Padmanabhan | |
| 2020/0280443 A1 | 9/2020 | Simons | |
| 2021/0044976 A1* | 2/2021 | Avetisov | G06F 21/64 |
| 2021/0135865 A1 | 5/2021 | Joseph | |
| 2022/0027522 A1* | 1/2022 | Kasheshian | G06F 21/552 |
| 2022/0210147 A1* | 6/2022 | Galvin | H04L 63/18 |
| 2022/0271920 A1 | 8/2022 | Wells et al. | |
| 2022/0272044 A1 | 8/2022 | Wells et al. | |
| 2022/0272102 A1 | 8/2022 | Mestery et al. | |

OTHER PUBLICATIONS

Alicherry, et al., "DIPLOMA: Distributed Policy Enforcement Architecture for MANETs", 2010 Fourth International Conference on Network and System Security, 10 pages.

Alicherry, et al., "Misuse Detection in Consent-Based Networks", Springer-Verlag Berlin Heidelberg 2011, 19 pages.

Naous, et al., "Verifying and enforcing network paths with ICING", ACM CoNEXT 2011, Dec. 6-9, 2011, 14 pages.

Rosenberg. et al., "A Framework for Consent-Based Communications in the Session Initiation Protocol (SIP)", Oct. 2008, 62 pages.

Rosenberg, et al., "Requirements for Consent-Based Communications in the Session Initiation Protocol (SIP)", Apr. 2006, 16 pages.

Seehra, et al., "A policy framework for the future Internet", 2009, 6 pages.

Office Action for U.S. Appl. No. 17/183,977, mailed on Aug. 17, 2022, Wells, "Enforcing Consent Contracts to Manage Network Traffic", 12 Pages.

Office Action for U.S. Appl. No. 17/183,900, mailed on Apr. 11, 2023, Kyle Mestery, "Creating Network-Based Consent Contracts", 21 pages.

Office Action for U.S. Appl. No. 17/183,977, mailed on Feb. 21, 2023, Wells, "Enforcing Consent Contracts to Manage Network Traffic", 14 Pages.

PCT Search Report and Written Opinion mailed Jun. 7, 2022 for PCT application No. PCT/US2022/017698, 9 pages.

Office Action for U.S. Appl. No. 17/183,977, mailed on Sep. 7, 2023, Ian James Wells, "Enforcing Consent Contracts to Manage Network Traffic", 14 pages.

Office Action for U.S. Appl. No. 17/183,900, mailed on Sep. 21, 2023, Kyle Andrew Donald Mestery, "Creating Network-Based Consent Contracts", 19 pages.

PCT International Preliminary Report on Patentability mailed Nov. 30, 2023 for PCT Application No. PCT/US2022/029769, 9 pages.

Enck W., et al., "TaintDroid: An Information-Flow Tracking System for Realtime Privacy Monitoring on Smartphones", Computer Systems, vol. 32, Issue. 2, Article No. 5, Jun. 2014, 29 Pages.

Non-Final Office Action for U.S. Appl. No. 17/324,876, dated Feb. 16, 2024, 35 Pages.

* cited by examiner

1200 ⤵

```
RECEIVE, AT A NETWORK DEVICE LOCATED IN A NETWORK, CONSENT CONTRACTS
INDICATING CONSENT BY FIRST DEVICES TO RECEIVE NETWORK
COMMUNICATIONS FROM SECOND DEVICES
1202
```

⬇

```
RECEIVE, AT THE NETWORK DEVICE, A PACKET THAT IS TO BE SENT OVER THE
NETWORK
1204
```

⬇

```
IDENTIFY, FROM THE PACKET, FIRST DATA INDICATING A FIRST DEVICE TO WHICH
THE PACKET IS BEING SENT AND SECOND DATA INDICATING A SECOND DEVICE
FROM WHICH THE PACKET WAS SENT
1206
```

⬇

```
DETERMINE, USING THE FIRST DATA AND THE SECOND DATA, WHETHER A
CONSENT CONTRACT OF THE CONSENT CONTRACTS INDICATE THAT THE FIRST
DEVICE HAS CONSENTED TO RECEIVING THE PACKET FROM THE SECOND DEVICE
1208
```

FIG. 12

CENTRALIZED CONSENT VENDORS FOR MANAGING NETWORK-BASED CONSENT CONTRACTS

TECHNICAL FIELD

The present disclosure relates generally to creating consent contracts for devices that indicate whether the devices consent to receiving network communications from other devices. Further, this disclosure relates generally to enforcing the consent contracts such that network communications are either allowed or disallowed in the network-communications layer prior to the network communications reaching the devices.

BACKGROUND

Computer networks are generally groups of computers or other devices that are communicatively connected, and use common sets of communication protocols, over interconnections for the purposes of exchanging data and/or sharing resources. Nodes of a computer network can include various types of connected devices, such as client devices (e.g., laptops, desktops, smartphones, and tablets), networking devices (e.g., servers, routers, switches, etc.), as well as an ever-expanding array of Internet-of-Things (IoT) devices (e.g., cameras, door locks, doorbells, refrigerators, audio/visual systems, thermostats, and various sensors) that communicate with one another. Various types of network architectures exist, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, and so forth.

In these various network architectures, various types of devices are generally all able to "reach" or communicate with the other devices in the networks, such as by use of global routing tables. That is, a device is generally able to send communications, such as invites, requests, or messages, to any other device over one or more networks using an address that is assigned to the destination device (e.g., Internet Protocol (IP) address, Media Access Layer (MAC) address, etc.). While this is advantageous in that devices are able to communicate data through networks more efficiently, and are able to access desirable information and services, there are disadvantages to allowing devices to be able to reach out to all other devices in a network.

As an example, receiving devices may end up receiving communications from initiating devices with which they do not wish to communicate. Although receiving devices can reject any requests for communication, and therefore decline a communication session, the unwanted requests are still delivered by the network to the receiving device. The delivery of these unwanted requests can cause various problems in networks. For instance, receiving devices can be subject to amplification and denial of service (DoS) attacks where malicious devices flood a receiving device with traffic. Thus, while it is advantageous in some respects to have devices reachable by other devices in the networks, this can also result in receiving devices having to reject communications that they do not wish to receive. Not only do the receiving devices have to put the time and resources into rejecting the communications, but intermediary devices in the network spend time and resources by unnecessarily forwarding communications through the network that are ultimately going to be rejected by the receiving device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 further illustrates how network devices enforce the consent contracts by allowing or disallowing network-based communications.

FIG. 12 illustrates a flow diagram of an example method for enforcing consent contracts to allow or disallow network-based communications between devices.

DESCRIPTION OF EXAMPLE EMBODIMENTS

Overview

Figure 1:
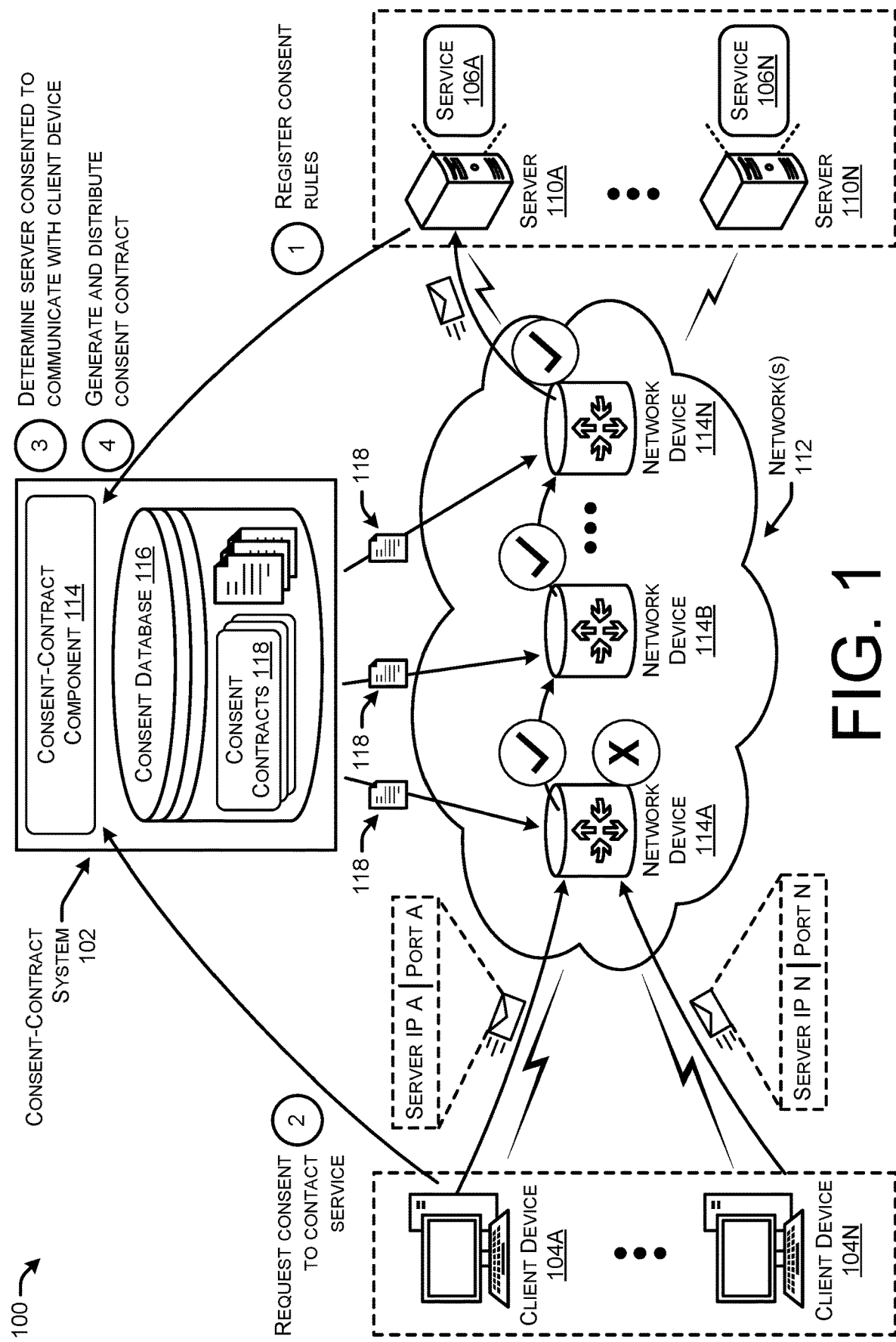
FIG. 1 illustrates a system-architecture diagram of an environment in which a consent-contract system creates consent contracts between client devices and servers.

The present disclosure relates generally to creating consent contracts for devices that indicate whether the devices consent to receiving network communications from other devices, and enforcing the consent contracts such that network communications are either allowed or disallowed in the network-communications layer prior to the network communications reaching the devices.

A first method described herein includes techniques for creating consent contracts for networking communications. The first method may include receiving, at a consent-contract system, consent data that indicates consent by a first device to receive network communications from sending devices. Additionally, the first method may include receiving, at the consent-contract system, request data that includes a request by a second device to communicate with the first device. Further, the first method may include determining, using the consent data and the request data, that the first device consented to receive network communications from the second device. Even further, the first method may include creating a consent contract that indicates consent by the first device to receive the network communications from the second device.

A second method described herein includes techniques for managing consent contracts for networking communications. The second method may include storing consent contracts at a consent-contract system, wherein the consent contracts indicate consent by receiving devices to receive network communications from sending devices. Additionally, the second method may include receiving, at the consent-contract system, a request from a first device associated with communicating with a second device. Further, the second method may include determining, at the consent-contract system and using the consent contracts, whether the second device has consented to receiving network communications from the first device.

A third method described herein includes techniques for enforcing a consent contract for network communications. The third method may include receiving, at a network device located in a network, consent contracts indicating consent by first devices to receive network communications from second devices. Further, the third method may include receiving, at the network device, a packet that is to be sent over the network, and identifying, from the packet, a first address of a first device to which the packet is being sent and a second address of a second device from which the packet was sent. Additionally, the third method may include determining, using the first address and the second address, whether a consent contract of the consent contracts indicate that the first device has consented to receiving the packet from the second device.

Additionally, the techniques of at least the first method, second method, and third method, and any other techniques described herein, may be performed by a system and/or device having non-transitory computer-readable media storing computer-executable instructions that, when executed by one or more processors, performs the method(s) described above.

Example Embodiments

The present disclosure relates generally to techniques for creating consent contracts for devices that indicate whether the devices consent to receiving network-based communications from other devices. Further, the techniques include enforcing the consent contracts such that network-based communications are either allowed or disallowed in the network-communications layer prior to the network communications reaching the devices. Rather than simply allowing a device to communicate with any other device over a network, the techniques described herein include building in consent for network-based communications where the consent is consulted at one or more points in a communication process to make informed decisions about network-based traffic.

In network architectures, devices are generally all able to "reach" or communicate with the other devices in the networks. Take for example the Internet where a device can address a packet to any other device, and by default, that packet will be sent to a router and be routed across the network to the receiving device. That packet is generally routed across the network regardless of whether the receiving device actually wants to receive the packet. However, packets that are routed across the network, but are ultimately rejected, result in wasted resources in that each device along the route must process the packets and transmit the packets to the next hop. Further, the receiving device may be forced to reject connections that are unwanted (which takes resources), and/or an entity associated with the receiving device may put a firewall in place to block certain connections (which is, among other purposes, an optimized for server load).

Various techniques are used to prevent unwanted connections on the receiving end, such as using Access Controls Lists (ACLs) or firewalls to filter traffic based on source addresses. However, these ACLs or firewalls are generally placed near the receiving devices to ensure that all traffic intended for the receiving device is inspected using the ACLs or firewalls. There are various inefficiencies with this, such as (i) unwanted packets traversing the entire network, including the internet, which is inefficient, (ii) maintaining and updating large filtering tables, and (iii) susceptibility to attacks, such denial-of-service (DoS) attacks.

To provide a conceptual example, consider the telephone system where a person can hand out their telephone number to an entity, and by doing so, the person effectively consents to receive calls from that entity for whatever purpose. Further, the person also consents to receive calls from anyone that the entity shares the telephone number with. These calls may be costly to receive (in terms of time and money), and by handing out their telephone number, that person has consisted to pay that cost. The person then must either ignore telephone calls, including wanted calls, or accept calls including unwanted calls. However, if the person could establish a consent relationship with potential callers that obtained the person's phone number, then the callers may only be able to make a telephone call to the person if they have their consent, and not only their telephone number.

This disclosure describes techniques and mechanisms for establishing consent between sending and receiving devices such that receiving devices only received wanted (or consented to) network-based communications. Using the consent relationship techniques described herein (referred to as "consent contracts"), network-based communications that are unwanted, or un-consented to, are dropped or rejected at one or more places in a communication process. Generally, the communications that can be managed using consent contracts as described herein may include layer 2 and layer 3 networking communications, as well as higher-level communications (e.g., layer 4-layer 7).

The techniques described herein include creating consent contracts that represent relationships or agreements between devices that consent to communicate with each other. Generally, a centralized consent-contract system may be used to create, maintain, and potentially enforce consent contracts. In some instances, the consent-contract system may be a designated system used to create and help enforce consent contracts. In various examples, the consent-contract system may be implemented at, or by, various centralized vendors, such as a Domain Name System (DNS) implementation, a Certificate Authority (CA) implementation, a network controller implementation, and so forth.

The consent-contract system may generally be a trusted system that is used to create consent contracts between devices. Generally, devices can provide the consent-contract system with consent data that indicates the devices, or the types of communications, with which the devices consent to communicating. As an example, devices may simply provide the consent-contract system with ranges of IP addresses with which the devices consent to communicating (e.g., an "allowed" list). As another example, devices may provide the consent-contract system with ranges of IP addresses with which the devices do not consent to communication (e.g., a "rejected" list). In some instances, the consent-contract system may indicate whether or not they consent to receiving communications based on a type of communication, or a purpose of the communication. Generally, the consent may be specified by various entities, such as the receiving device itself, a network stack running on the receiving device, an application running on the receiving device, and so forth. Upon receiving an indication of the consent data from devices, the consent-contract system may store the consent data for later use in determining whether the devices consent to receiving communications from other devices.

In order to communicate with a receiving device, a sending device may request that the consent-contract system create a consent contract such that the sending device is able to send network-based communications to the receiving device. The consent-contract system may determine whether the receiving device has consented to receiving communications from the sending device. For instance, the consent-contract system may determine whether an IP address of the sending device is included in an allowed list of IP addresses provided by the receiving device. If the consent-contract system determines that the receiving device has not consented to communicating with the sending device, the consent-contract system may reject the request (e.g., send a rejection to the sending device, refrain from establishing a consent contract, etc.). However, the consent-contract system may create a consent contract in response to determining that the receiving device has consented to communicating with the sending device. Generally, a consent contract may indicate that a receiving device has consented to communicating with a sending device. The consent contract may indicate addresses associated with the receiving and sending devices (e.g., IP addresses, MAC addresses, virtual IP addresses, etc.). Further, the consent contract may indicate a scope of the consented communication, such as a type of communication that the receiving device has consented to receiving from the sending device.

In some examples, consent may be established using other mechanisms, such as using permissions granted to entities. For instance, permissions may be granted to devices that have particular identities. Devices may be validated, authorized, and/or otherwise verified by a trusted party (e.g., an identity provider or other trusted provider) that issues identities to the devices. The identities may be provided with different authorizations based on the identity. For example, some identities may have different permissions, similar to security levels, where they are given consent to talk to additional devices, less devices, different devices, and/or any combination thereof. Devices can provide consent to the consent-contract system to receive communications based on the identity issued to requesting devices. In this way, devices may contact the contract-contract system and provide an indication of their identity (or other indication of permissions), and the consent-contract system may determine whether receiving devices to which the communications are intended have consented to communicating with the identity or permissions of the requesting device. Thus, using identities and/or other indications of permissions, consent-contract systems may determine consent and create consent contracts.

After creating consent contracts, the consent-contract system may enforce the consent contracts by allowing or disallowing communications. In some instances, the consent-contract system may enforce the consent contracts such that sending devices are required to request consent to communicate with a receiving device. In an example, the consent-contract system may be a DNS server where sending devices send DNS queries, or requests, for an IP address associated with the receiving device. The DNS server (implemented as the consent-contract system) may determine whether the receiving device has consented to communicating with the sending device. The DNS server may reject the DNS query if consent is not found, and may respond to the DNS query with the IP address of the receiving device if consent is found. As another example, the consent-contract system may be implemented as a certificate authority (CA). For instance, a CA server may receive a request from a sending device to validate a signed certificate associated with a receiving device. The CA server (implemented as the consent-contract system) may determine whether the receiving device has consented to communicating with the sending device. The CA server may reject the validation request if consent is not found, and may respond to the validation request with confirmation of the signed certificate if consent is found. Accordingly, the consent contracts may be enforced by various types of centralized, consent-contract systems.

In some instances, the consent contracts may be enforced using a socket on the sending device. For instance, a receiving device may provide consent data to a consent-contract system, and the server may open a socket, bind a name to the socket to be accessible from the network, and listen for connections for which they provided consent. The sending device may similarly open a socket to communicate with the receiving device, and the socket may be configured to perform consent validation when the sending device attempts to create the socket. For instance, to bind the socket, the sending device may perform consent validation with the consent-contract system. If the consent-contract system determines that the receiving device has consented to communications from the sending device, then the consent-contract system may validate the consent for the sending device, and the socket on the sending device may connect to the socket on the receiving device to establish a connection. However, if the consent-contract system determines that the receiving device has not consented to communicating with the sending device, then connection may not be established.

In various examples, the consent contracts may be provided to network devices that are disposed in a communication path between the sending device and receiving device. For instance, the consent contracts may be provided to personal area network (PAN) routers associated with the sending device, wide area network (WAN) routers, network switches, and so forth. The network devices that are provided with the consent contracts may then enforce the consent contracts by inspecting, and allowing or disallowing traffic to proceed through a network based on the consent contracts. For instance, the consent contracts may represent mappings between addresses for sending devices and receiving devices that have consented to communicating with each other. The network devices may identify the addresses of the devices from the packets, and if the consent contracts indicate that consent has been given, forward the packets to a next hop in the network. Conversely, if the network devices do not identify, from the consent contracts, consent from the receiving device to receive communications, the network devices may drop the packets.

Generally, the techniques of this application improve the performance of various types of networks by reducing the amount of network-based communications or traffic that is sent over one or more networks, but ultimately are dropped or unwanted by the destination device. Some of the techniques described herein are with reference to servers consenting (or not consenting) to receiving network-based communications from client devices. However, the techniques are generally applicable to any type of sending device or receiving device. The consent contracts described herein may be applied at any point in a communication process (e.g., socket layer, network layer, etc.), and by any device in a network that receives a packet. In some instances, the closer a network device is to the sending device, the more advantageous it is for that network device to drop, or allow, a packet to proceed based on evaluating the packet against a consent contract. In some instances, consent contracts may expire after periods of time, and sending devices may need to interact with the consent-contract system to create another consent contract for a receiving device.

In some examples, the consent contracts described herein may be distributed at the IP layer such that the consent contracts are usable with any protocol. That is, communications by any communication protocol that is usable with the IP-based communications may be controlled using the consent contracts described herein. The network-based communications described herein may include lower-level networking (e.g., layer 2, layer 3, etc.), as well as higher-level communication (e.g., layer 4-layer 7). For instance, communications such as Voice over IP (VoIP) communications, social media application communications, etc., may be controlled by consent contracts as described herein.

Generally, a consent contract is any piece of data and/or software that represents consent by a device to receive communications from another device. The consent contract may indicate specific devices that are allowed or rejected, specific communication types that are allowed or rejected, specific communication purposes that are allowed or rejected, and so forth.

As described herein, a network device may comprise any type of component, hardware-based, software-based, etc., that is capable of evaluating packets and consent contracts. For example, a network device or component may comprise hardware-based devices such as a router, a network switch (e.g., leaf switch, spine switch, etc.), a gateway, a network interface card (NIC), a smart NIC, a server, a Field Programmable Gate Array (FPGA), an Application-Specific Integrated Circuit (ASIC), and/or any other hardware device capable of evaluating a packet and a consent contract. The network devices (or components) may comprise a software-based component as well, such as a virtual machine, container, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment 100 in which a consent-contract system 102 creates consent contracts between client devices and servers FIG. 1 further illustrates how network devices enforce the consent contracts by allowing or disallowing network-based communications.

As illustrated, the environment 102 includes client devices 104A-104N (where "N" is any integer greater than "0"). The client devices 104 may be any type of computing device, such as desktop computers, laptop or other portable computers, tablets, e-reader, smartphone, wearable devices, or other computing devices. In some instances, the client devices 104 may be Internet-of-Things (IoT) devices, such as connected appliances, smart home devices, autonomous vehicles or machines, factory devices, sensors, and/or other IoT devices configured to communicate over one or more networks. In various examples, the client devices 104 may be various types of networked devices, such as servers, switches, routers, hubs, bridges, gateways, modems, repeaters, access points, and/or any other type of computing device that may be running any type of software and/or virtualization technology.

The client devices 104 may determine to reach out to one or more services 106A-106N for various purposes. The services 106 may comprise any type of service 106, such as cloud services (e.g., scalable compute services, memory services, storage services, networking services, etc.), applications (e.g., video applications, message applications, web applications, security applications, etc.), and/or any other type of service that can be hosted, at least partly, on one or more servers 110. However, the services 106 may comprise any type of service 106 that can be used for any purpose and support any functionality.

Further, although illustrated as servers 110, the servers 110 may be any type of computing device that can communicate with the client device 104. That is, the servers 110 and the client devices 104 may be any type of computing device capable of communicating over one or more networks 112, and for any purpose. The network(s) 112 may include and/or be comprised of devices housed or located in one or more data centers. The network(s) 112 may include one or more networks implemented by any viable communication technology, such as wired and/or wireless modalities and/or technologies. The network(s) 112 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 112 may include devices, virtual resources, or other nodes that relay packets from one network segment to another by nodes in the computer network. The network(s) 112 may include multiple devices that utilize the network layer (and/or session layer, transport layer, etc.) in the OSI model for packet forwarding, and/or other layers. The network(s) 112 may include various hardware devices, such as routers, switches, gateways, smart NICs, NICs, ASICs, FPGAs, servers, and/or any other type of device. Further, the network(s) 112 may include virtual resources, such as VMs, containers, and/or other virtual resources.

In some instances, the network(s) 112 and/or the servers 110 may be located in one or more data centers. The one or more data centers may be physical facilities or buildings located across geographic areas that designated to store networked devices that are part of the network(s) 112. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the network(s) 112 may not be located in explicitly defined data centers, but may be located in other locations or buildings.

As illustrated, the consent-contract system 102 may include a consent-contract component 114 that comprises logic, and is configured, to create, maintain, and/or enforce consent contracts 118 that are stored in one or more consent databases 116. The consent-contract system 102 may be one or more devices configured as a centralized, or distributed, system configured to create, manage, and potentially enforce consent contracts. In some instances, the consent-contract system 102 may be a designated system used to create and help enforce consent contracts. In various examples, the consent-contract system 102 may be implemented at, or by, various centralized vendors, such as a Domain Name System (DNS) implementation, a Certificate Authority (CA) implementation, a network controller implementation, and so forth.

Devices that desire to restrict communications that they receive may enlist with the consent contract system 102 to create consent contracts 118. Generally, the consent contracts 118 are pieces of data and/or software that represent consent by a device to receive communications from another device (e.g., consent from the server 110 to receive data from the client device 104). The consent contracts 118 may indicate specific devices that are allowed or rejected, specific communication types that are allowed or rejected, specific communication purposes that are allowed or rejected, and so forth.

In the specific illustration of FIG. 1, at "1," the services 106 and/or the servers 110 may register consent rules with the consent-contract system 102. The consent rules may be registered by one or more of the servers 110 themselves, one or more network stacks on the servers 110 (e.g., the kernel, a user-space networking stack, etc.), and/or the service 106 (e.g., application) running on the servers 110. The consent rules may simply be ranges of IP addresses with which the servers 110 and/or services 106 consent to communicating (e.g., an "allowed" list). As another example, the servers 110 and/or services 106 may provide the consent-contract system 102 with ranges of IP addresses with which the servers 110 and/or services 106 do not consent to communication (e.g., a "rejected" list). In some instances, the servers 110 and/or services 106 may indicate whether or not they consent to receiving communications based on a type of communication, or a purpose of the communication. Upon receiving an indication of the consent data from devices, the consent-contract system 102 may store the consent data for later use in determining whether the servers 110 and/or services 106 consent to receiving communications from other devices, such as the client devices 104.

At "2," at least one client device 104 may request consent to contract a service 106. For instance, the client device 104 may send a request to the consent-contract system 102 indicating an address associated with a server 110 and/or a service 106 with which the client device 104 would like to communicate. The consent-contract system 102 may identify information associated with the request from the client device 104. For instance, the request may include or be a packet that indicates an address of the client device 104 (e.g., MAC address, IP address, etc.), and/or may include information around a type of communication or purpose of communication that the client device 104 would like to have with the server 110 and/or service 106.

At "3," the consent-contract system 102 may determine whether the server 110 and/or service 106 consented to communicating with the client device 104. For instance, the consent-contract system 102 may determine whether the consent rules provided by the server 110 and/or service 106 and the request data sent from the client device 104 indicate that the server 110 and/or service 106 consent to communicating with the client device 104. This may include determining whether an address of the client device 104 is included in an allowed or permitted range of addresses indicated by the server 110 and/or service 106. In some instances, this may include determining that a type of communication, or a purpose of the communication, is consented to by the server 110 and/or service 106.

At "4," the consent-contract component 114 may generate and distribute one or more consent contracts 118. Generally, the consent contracts 118 indicate two or more devices that have consented to communicate with each other (e.g., send and receive network-based communications between each other). The consent-contract component 114 may send the consent contracts 118 to one or more network devices 114A-114N located in the network(s) 112. The network devices 114 may be any type of device configured to communicate data through the network(s) 112, such as servers, switches, routers, hubs, bridges, gateways, modems, repeaters, access points, and/or any other type of computing device that may be running any type of software and/or virtualization technology. In some instances, that network devices 114 may include, or be associated with NICs and smartNICs, FPGAs, ASICs, virtual machines, containers, and/or any other type of hardware-based or software-based network component.

The network devices 114 may be configured to analyze received network-based communications, such as packets, and determine whether the destination devices for those packets have consented to receiving the packets using the consent contracts 118. For instance, the network devices 114 may determine addresses for the client device 104 that sent a packet and for the server 110 for which the packet is intended. In the illustrative example, the client device 104A may send a packet that has a destination address corresponding to the IP address and port for server 110A, and the client device 104N may send a packet that has a destination address corresponding to the IP address and port for server 110N. As illustrated, the two packets may both hit network device 114A. Generally, it is more advantageous to have network devices 114 near the sending devices (e.g., client devices 104) to evaluate the packets against the consent contracts 118 and drop unwanted packets early in the network(s) 112.

In this example, the server 110A and/or service 106A may have consented to receiving communications from the client device 104A, and the consent-contract component 114 may have generated a consent contract 118 for the devices.

However, the server 110N and/or service 106N may not have agreed to receiving communications from the client device 104N. In such an example, the network device 114A may use the consent contracts 118 to determine that the server 110A and/or service 106A has consented to receiving the packet received from the client device 104A, and send the packet to the next-hop network device 114B. However, the network device 114A may use the consent contracts 118 to determine that the server 110N and/or service 106N has not consented to receiving the packet from the client device 104N, and the network device 114A may drop the packet.

In this way, the network devices 114 may enforce consent contracts 118 by dropping packets that have not been consented to by receiving devices. However, in some examples, the consent-contract system 102 may enforce consent contracts 118, as discussed later in this disclosure. In some instances, the consent contracts 118 may expire after a predefined period of time. In such examples, the consent-contract system 102 and/or the network devices 114 may delete or remove the consent contracts 118 from memory, or otherwise indicate that the consent contracts 118 have expired. In such examples, the devices may need to indicate consent to create a new consent contract 118.

The devices described herein may communicate with one another using any type of communication protocol and over any type of network. For instance, the client devices 104 may attempt to communicate with the servers using the transmission control protocol/Internet protocol (TCP/IP) that is used to govern connects to and over the Internet. As shown in FIG. 1, the packets illustrated may be a TCP synchronize packet (e.g., SYN packet) that is used to request that a connection be established between the client devices 104 and the servers 110. However, any type of protocol may be used as described herein.

In some instances, the servers 110 (and/or other receiving devices) may modify their addresses and/or create them on demand. For instance, the servers 110 may continue to change their addresses such that old consent contracts 118 are expired and/or new consent contracts 118 need to be created.

In some instances, the network devices 114 (and/or any other intermediary devices) may remap packets with service addresses given to the client devices 104 to private addresses of the actual server 106 and/or server 110. For instance, rather than giving actual addresses of the service 106 and/or servers 110, the client devices 104 (and/or other initiating devices) may be provided with service addresses or other addresses that can be mapped, by intermediary devices, to private addresses of the actual service 106 and/or server 110. In this way, the server 106 and/or server 110 need not modify or create new addresses, but the service or nonce addresses that are provided to the client devices 104 can be modified and re-mapped to the actual service 106 and/or server 110 addresses.

In some instances, a Border Gateway Protocol (BGP), or other protocol used to communicate routing and reachability information between autonomous systems, may be configured to use the consent techniques described herein. For instance, BGP reachability may be used upon determining that consent has been established between devices (e.g., the address has no routes if the address in not currently in use for a consent contract 118). In some instances, the techniques may be applied using a source-routing extension to the BGP protocol in order to enforce consent for BGP reachability.

Thus, according to the techniques described herein, an address used for a consented-to connection may not remain valid for use for an unconsented-to connection at some later time. Additionally, these techniques provide for the granularity that devices can consent different to different connections from the same IP address.

Figure 2:
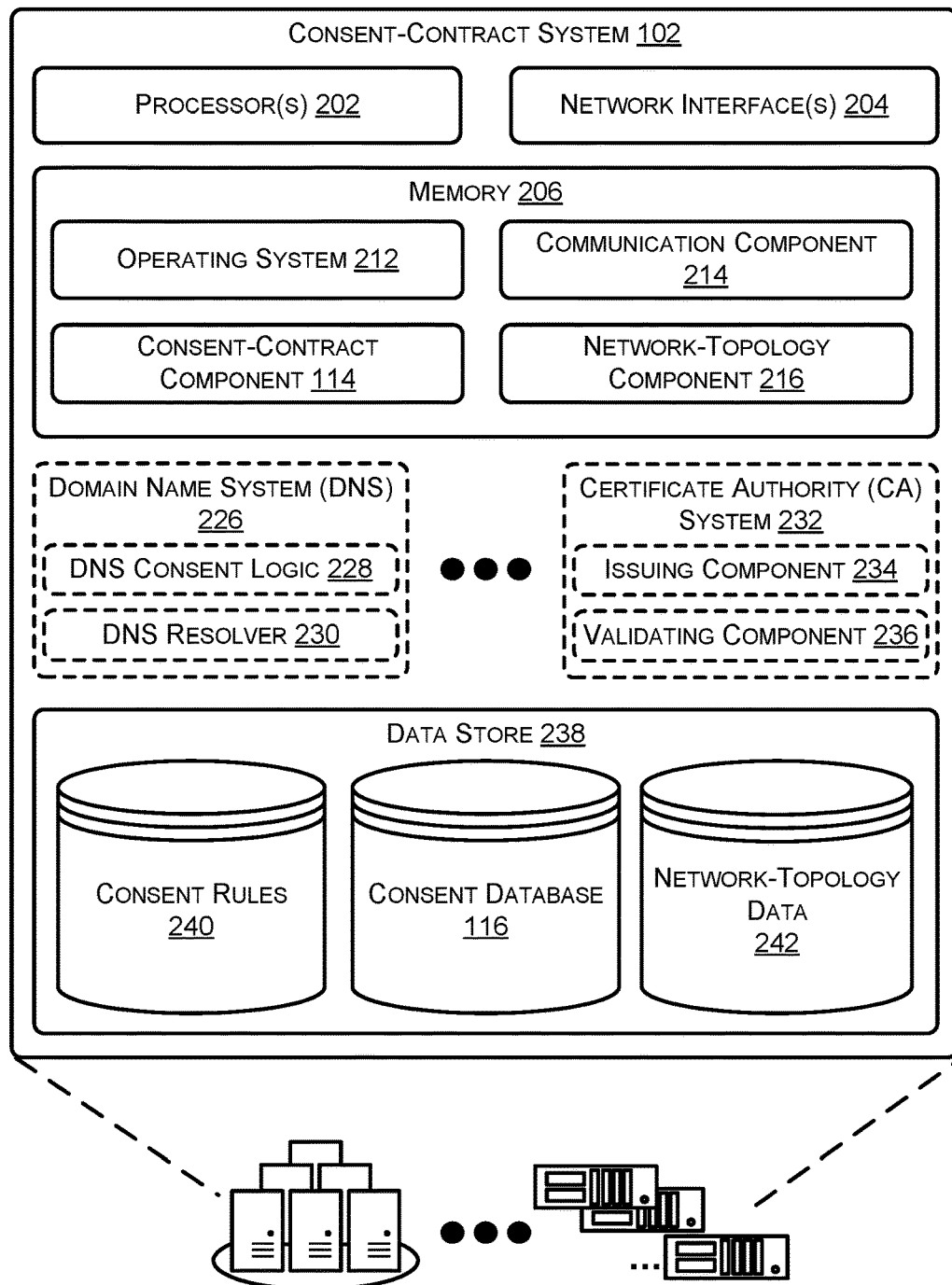
FIG. 2 illustrates a component diagram of an example consent-contract system that is used to create, distribute, and/or enforce consent contracts for network-based communications between devices.

FIG. 2 illustrates a component diagram 200 of an example consent-contract system 102 that is used to create, distribute, and/or enforce consent contracts for network-based communications between devices. Generally, the consent-contract system 102 may comprise a device, or a system of devices arranged in various manners, including a centralized manner, a distributed manner, and/or a combination thereof. In various examples, the consent-contract system 102 may be implemented at, or by, various entities or systems, such as a Domain Name System (DNS) system, a Certificate Authority (CA) system, a network controller system, and so forth.

As illustrated, the consent-contract system 102 may include one or more hardware processors 202 (processors), one or more devices, configured to execute one or more stored instructions. The processor(s) 202 may comprise one or more cores. Further, the consent-contract system 102 may include one or more network interfaces 204 configured to provide communications between the consent-contract system 102 and other devices, such as the client devices 104, the network devices 114, the servers 110, and/or other systems or devices. The network interfaces 204 may include devices configured to couple to personal area networks (PANs), wired and wireless local area networks (LANs), wired and wireless wide area networks (WANs), and so forth. For example, the network interfaces 204 may include various TCP/IP network interfaces.

The consent-contract system 102 may include memory 206, such as computer-readable media, that stores various executable components (e.g., software-based components, firmware-based components, etc.). The memory 206 may generally store components to implement functionality described herein. The memory 206 may store an operating system 212 utilized to control the operation of components of the consent-contract system 102. Further, the memory 206 may store a communication component 214 that comprises software (e.g., any protocol stack) to enable the consent-contract system 102 to communicate with other devices using the network interface(s) 204.

In some instances, the memory 210 may store the consent-contract component 114 that comprises logic or computer-readable instructions that, when executed, causes the consent-contract component 114 to create, manage, and/or enforce consent contracts 118. For instance, the consent-contract component 114 may be configured to receive consent rules 240 from various devices that utilize the consent-contract system 102. For instance, the consent-contract component 114 may receive consent rules from the client devices 104, servers 110, and/or other devices that would like to reject network communications to which they have not consented receiving. The consent rules 240 received by the consent-contract component 114 may generally be any type of consent data that indicates devices and/or communications with which receiving devices consent to receiving.

For instance, the consent rules 240 may simply be ranges of IP addresses with which the servers 110 and/or services 106 consent to communicating (e.g., an "allowed" list). As another example, the consent rules 240 may be ranges of IP addresses with which devices do not consent to communication (e.g., a "rejected" list). In some instances, consent rules 240 may indicate whether or not devices consent to receiving communications based on a type of communication, or a purpose of the communication. Upon receiving an indication of the consent rules 240 (or "consent data") from devices, the consent-contract component 114 may store the consent rules 240 for later use in determining whether the devices consent to receiving communications from other devices. Generally, the consent rules 240 may be stored in associated with the device that provided the consent rules 240 (e.g., mapping between consent rules 240 and devices that provided the consent).

Further, the consent-contract component 114 may create consent contracts 118 using the consent rules 240 and requests from devices that would like to communicate with other devices. For instance, the consent-contract component 114 may receive requests from a client device 104 and determine that an IP address (or other address) of the client device 104 is within an allowed or consented IP address list in consent rules 240 received from a server 110 and/or service 106. As another example, the consent-contract component 114 may receive requests from the client device 104 to perform a particular type of communication, and/or a communication for a particular purpose. The consent-contract component 114 may determine that the communication type and/or purpose is within a consented type of communication or purpose. Upon determining that consent rules 240 indicate that a receiving device has consented to receiving communications from a requesting device, the consent-contract component 114 may generate a consent contract 118 indicating consent between the devices and store the consent contract 118 in the consent database 116.

The memory 206 may further store a network-topology component 216 that is configured to determine network-topology data 242 for the network(s) 112. For instance, the network-topology component 216 may behave, or include a network controller that is configured to monitor communications in the network(s) 112, such as by receiving control-plane and/or data-plane data indicating routes, topologies, and/or locations of the network devices 114 in the network(s) 112. The network-topology component 216 may generate the network-topology data 242 and store the data in the data store 238.

In examples where the consent contracts 118 and distributed to, and enforced by, network devices 114, the consent-contract component 114 may use the network-topology data 242 to determine which network devices 114 should be provided with the consent contracts 118. For instance, the consent-contract component 114 may use the network-topology data 242 to determine which network devices 114 are disposed between the client devices 104 and the servers 110, and provide those network devices 114 with the relevant consent contracts 118.

The consent-contract system 102 may include one or more data stores 238 configured to store the various data and databases described herein. The data store 238 may comprise any type of computer memory including long-term memory (e.g., Read Only Memory (ROM), Random Access Memory (RAM), caches, etc.). The data store 228 may include at least the consent rules 240, the consent database 116, the network-topology data 242, and/or any other data described herein.

The consent-contract system 102 may be, or include, a DNS 226 that includes DNS consent logic 228 as well as a DNS resolver 230. The DNS resolver 230 may comprise logic to resolve domain names into IP addresses. The DNS 226 may be used as a point at which to enforce the consent contracts 118 in some examples. For instance, a DNS server of the DNS 226 may receive a DNS request from a client device 104. The client device 104 may be requesting that the DNS server resolve a domain name (e.g., website address) into an IP address at which a device associated with the domain name is reachable. For instance, the domain name may be associated with the service 106A, and the DNS resolver 230 may be configured to resolve the domain name into an IP address associated with the server 110A and/or the service 106A. However, the DNS consent logic 228 may determine whether the server 110A and/or the service 106A has given consent to receive communications from the client device 104 using the consent contracts 118. If the DNS consent logic 228 determines that the server 110A and/or the service 106A and the client device 104A have established a consent contract 104, and/or if the consent rules 240 received from the server 110A and/or the service 106A indicate consent, the DNS resolver 230 may then resolve the domain name into the IP address and return the IP address to the client device 104A. Conversely, if the DNS consent logic 228 determines that the server 110A and/or the service 106A have not consented to communicating with the client device 104A, then the DNS resolver 230 will not return the IP address to the client device 104A. In this way, the consent-contract system 102 may be, or include, a DNS 226 that is usable to enforce consent contracts 118 and/or consent rules 240.

In some examples, the consent-contract system 102 may be, or include, a CA system 232 that includes an issuing component 234 as well as a validating component 236. Generally, the issuing component 234 may issue digital certificates that certify the ownership of a public key by the named subject of the certificate. For instance, the issuing component 234 may issue the server 110 a digital certificate that contains a public key as well as the identity of the server 110 as the owner. Thus, the servers 110 may receive signed digital certificates from the issuing component 234. In some instances, the client device 104A may wish to contact a server 110A and send a request to the CA system 232 to validate the signed digital certificate of the server 110A. The validating component 236 may initially determine whether the server 110A and/or the service 106A has given consent to receive communications from the client device 104A using the consent contracts 118. If the validating component 236 determines that the server 110A and/or the service 106A and the client device 104A have established a consent contract 104, and/or if the consent rules 240 received from the server 110A and/or the service 106A indicate consent, the validating component 236 may then determine that the signed certificate is valid and notify the client device 104A that the signed certificate is valid. Conversely, if the validating component 236 determines that the server 110A and/or the service 106A have not consented to communicating with the client device 104A, then the validating component 236 will not return an indication of the signed certificate as being valid In some instances, however, the consent-contract system 102 may include or be a network controller that manages some or all of the control plane activities of the network(s) 112, and manages or monitors the network state using one or more centralized control models. Further, the consent-contract system 102 may include or be an identify service provider as well that enforces consent contracts 118 at the identity level (e.g., enforce consent contracts 118 when a user provides an indication of identity, such as username and password or other authentication mechanisms).

Figure 3:
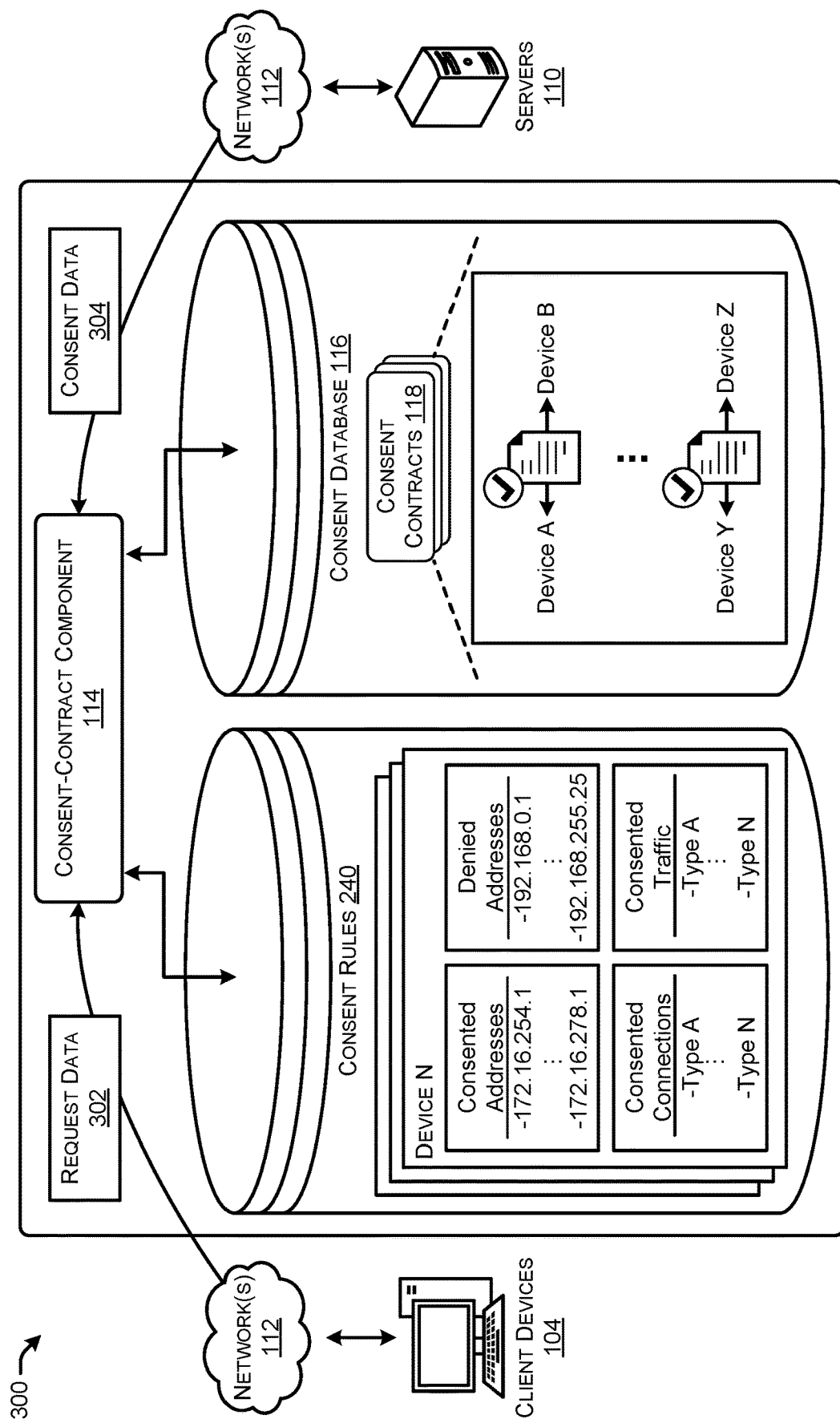
FIG. 3 illustrates a system-architecture diagram of an environment in which a consent-contract system creates consent contracts between client devices and servers.

FIG. 3 illustrates a system-architecture diagram of an environment 300 in which a consent-contract system 102 creates consent contracts 118 between client devices 104 and servers 110 and/or services 106. However, the consent contracts 118 may be established between any type of computing device or node.

As illustrated in FIG. 3, the consent-contract component 114 may create and manage consent contracts 118. For instance, the consent-contract component 114 may be configured to receive consent data 304 that represents consent rules 240 from various devices that utilize the consent-contract system 102. For instance, the consent-contract component 114 may receive consent data 304 from the client devices 104, servers 110, and/or other devices that would like to reject network communications to which they have not consented receiving. The consent data 304 received by the consent-contract component 114 may generally be any type of consent data 304 that indicates devices and/or communications with which receiving devices consent to receiving.

For instance, the consent data 304 may simply be ranges of IP addresses with which the servers 110 and/or services 106 consent to communicating (e.g., an "allowed" list). As another example, the consent data 304 may be ranges of IP addresses with which devices do not consent to communication (e.g., a "rejected" list). In some instances, consent data 304 may indicate whether or not devices consent to receiving communications based on a type of communication, or a purpose of the communication. Upon receiving an indication of the consent data 304 from devices, the consent-contract component 114 may store corresponding consent rules 240 for later use in determining whether the devices consent to receiving communications from other devices. Generally, the consent rules 240 may be stored in associated with the device that provided the consent rules 240 (e.g., mapping between consent rules 240 and devices that provided the consent).

Further, the consent-contract component 114 may create consent contracts 118 using the consent rules 240 and request data 302 from devices that would like to communicate with other devices. For instance, the consent-contract component 114 may receive request data 302 from a client device 104 and determine that an IP address (or other address) of the client device 104 is within an allowed or consented IP address list in consent rules 240 received from a server 110 and/or service 106. As another example, the consent-contract component 114 may receive request data 302 from the client device 104 to perform a particular type of communication, and/or a communication for a particular purpose. The consent-contract component 114 may determine that the communication type and/or purpose is within a consented type of communication or purpose. Upon determining that consent rules 240 indicate that a receiving device has consented to receiving communications from a requesting device, the consent-contract component 114 may generate a consent contract 118 indicating consent between the devices and store the consent contract 118 in the consent database 116.

Figure 4:
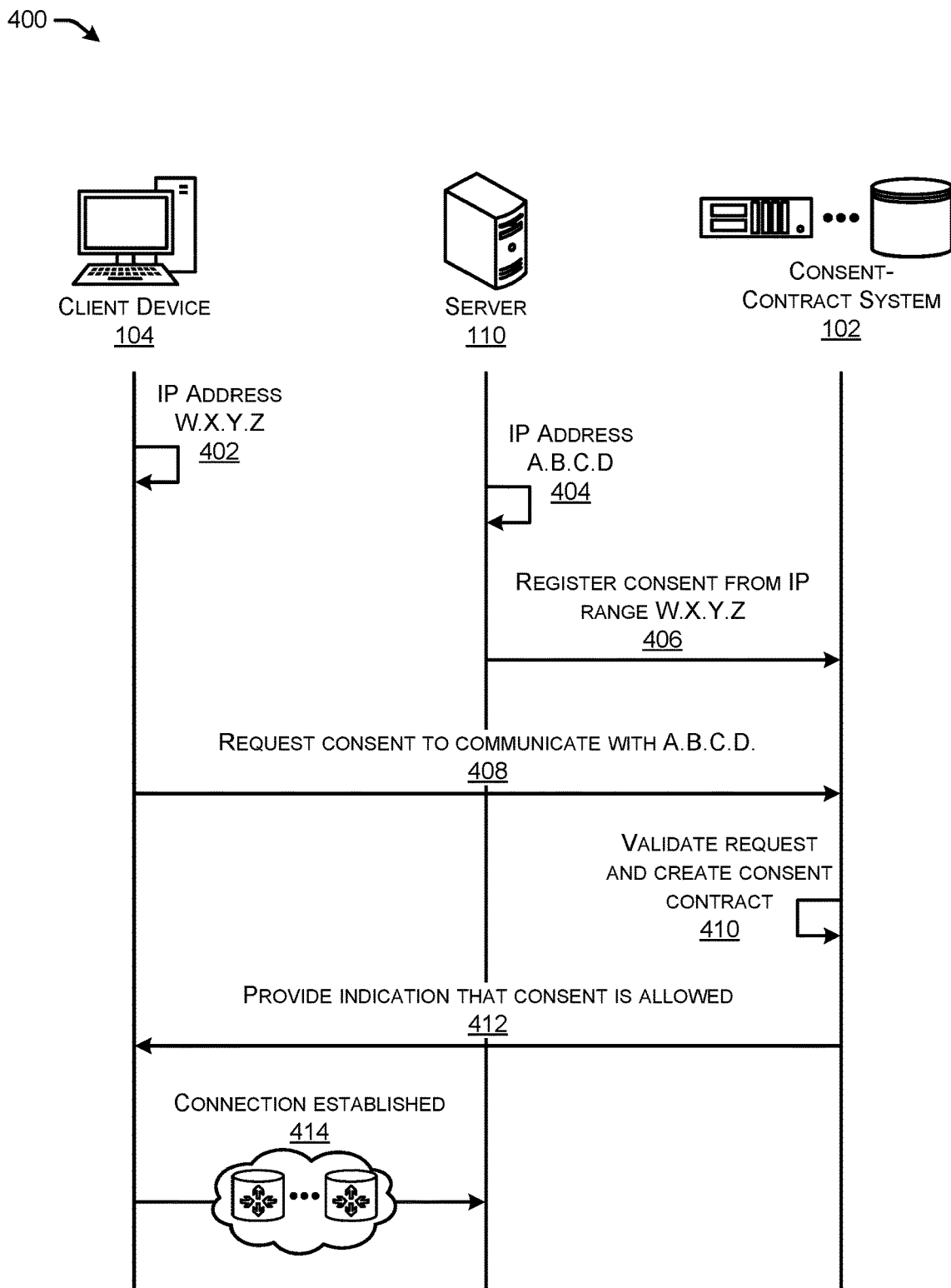
FIG. 4 illustrates a flow diagram of an example method for a client device and a server to establish a consent contract using a consent-contract system.

FIG. 4 illustrates a flow diagram of an example method 400 for a client device 104 and a server 110 to establish a consent contract 118 using a consent-contract system 102.

At 402, the client device 104 may be assigned an IP address of "W.X.Y.Z" when the client device 104 joins a network and/or persistently by configuration of the hardware or software of the client device 104. Similarly, at 404 the server 110 may be assigned an IP address of "A.B.C.D" when the server 110 joins a network and/or persistently by configuration of the hardware or software of the server 110.

At 406, the server 110 may register consent for devices from IP range "W.X.Y.Z" with the consent-contract system 102. That is, the server 110 may send consent data 304 to the consent-contract system 102 that indicates devices with which the server 110 is consenting to receive communications.

At 408, the client device 104 may send a request to the consent-contract system 102 for consent to communicate with a device having the IP address of "A.B.C.D" which is the server 110. The consent-contract system 102 may determine whether or not the server 110 has consented to communicating with the client device 104. For instance, the consent-contract system 102 may determine whether the client device 104 and server 110 have created a consent contract 118, and/or if consent rules 240 received from the server 110 indicates consent to communicate with the client device 104.

At 410, the consent-contract system 102 may validate the request and create a consent contract 118. For instance, the consent-contract system 102 may use request data 302 from the client device 104 and consent rules 240 associated with the server 110 to create a consent contract 118.

At 412, the consent-contract system 102 may provide an indication to the client device 104 that consent is allowed and that the client device 104 is permitted to communicate with the server. The client device 104 may then establish, at 414, a connection with the server 110 (e.g., TCP handshake to establish a TCP connection) over the network(s) 112.

Figure 5:
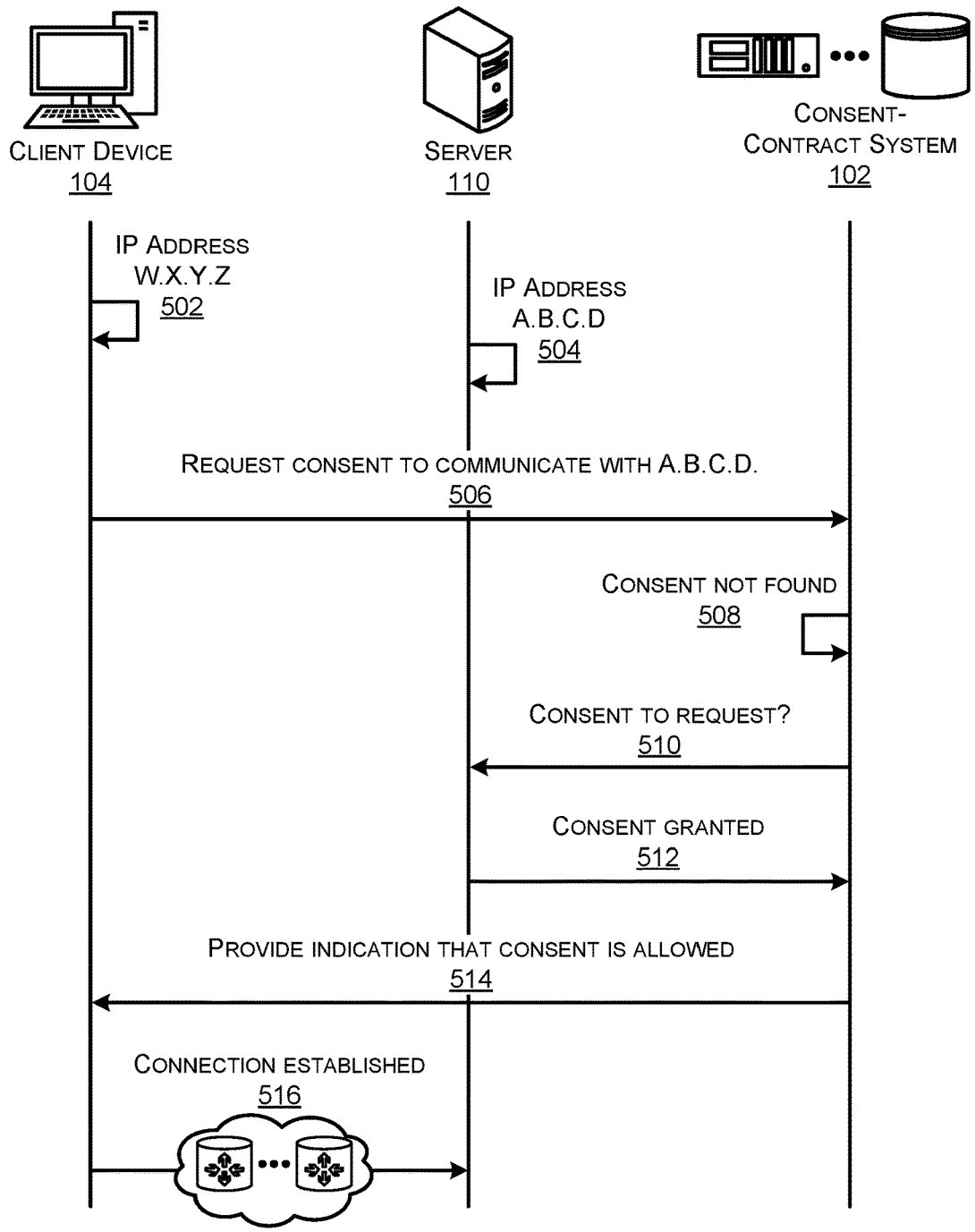
FIG. 5 illustrates a flow diagram of an example method for a consent-contract system to determine whether a server would like to establish a consent contract with a client device.

FIG. 5 illustrates a flow diagram of an example method 500 for a consent-contract system 102 to determine whether a server 110 would like to establish a consent contract 118 with a client device 104.

At 502, the client device 104 may be assigned an IP address of "W.X.Y.Z" when the client device 104 joins a network and/or persistently by configuration of the hardware or software of the client device 104. Similarly, at 504 the server 110 may be assigned an IP address of "A.B.C.D" when the server 110 joins a network and/or persistently by configuration of the hardware or software of the server 110.

At 506, the client device 104 may send a request to the consent-contract system 102 for consent to communicate with a device having the IP address of "A.B.C.D," which is the server 110 in this example.

At 508, the consent-contract system 102 may determine that the server 110 has not provided consent for the client device 104 to communicate with the server 110. For instance, the server 110 may not have provided consent data 304 indicating that the client device 104 is permitted to reach out to the server 110.

At 510, the consent-contract system 102 may send the server 110 a request indicating whether or not the server 110 consents to communicate with the client device 104. The request may indicate an IP address of the client device 104, and/or a purpose of the communication or a type of the communication. The server 110 may determine that it would like to communicate with the client device, and at 512, provide the consent-contract system 102 with an indication that consent is granted for the client device 104 to communicate with the server 110.

At 514, the consent-contract system 102 may provide an indication to the client device 104 that consent is allowed and that the client device 104 is permitted to communicate with the server. The client device 104 may then establish, at 516, a connection with the server 110 (e.g., TCP handshake to establish a TCP connection) over the network(s) 112.

Figure 6:
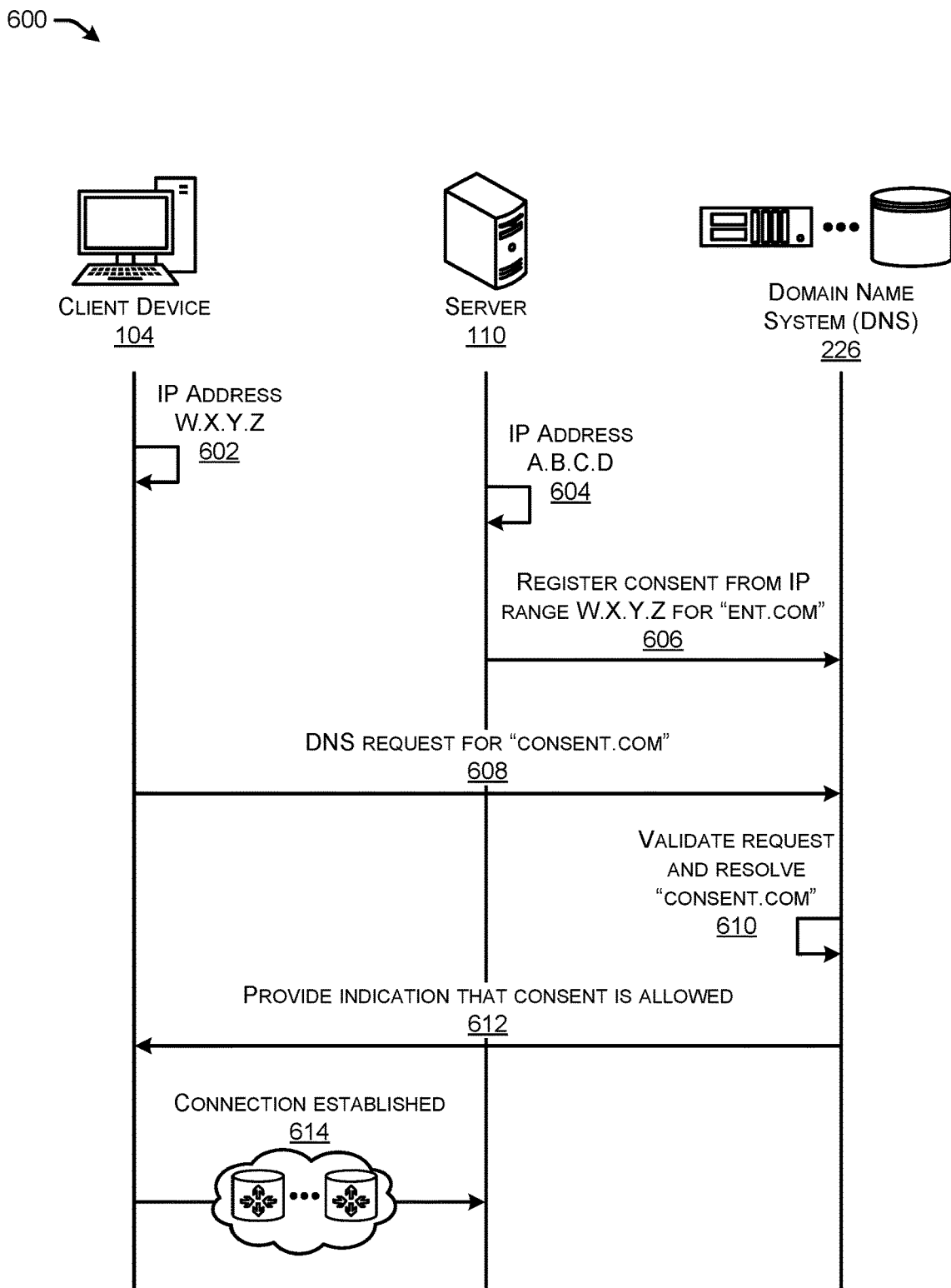
FIG. 6 illustrates a flow diagram of an example method for a Domain Name System (DNS) to create and use consent contracts to allow or disallow network-based communications.

FIG. 6 illustrates a flow diagram of an example method 600 for a Domain Name System (DNS) 226 to create and use consent contracts 118 to allow or disallow network-based communications.

At 602, the client device 104 may be assigned an IP address of "W.X.Y.Z" when the client device 104 joins a network and/or persistently by configuration of the hardware or software of the client device 104. Similarly, at 604 the server 110 may be assigned an IP address of "A.B.C.D" when the server 110 joins a network and/or persistently by configuration of the hardware or software of the server 110.

At 606, the server 110 may register consent for devices from IP range "W.X.Y.Z" with the DNS 226. That is, the server 110 may send consent data 304 to the DNS 226 that indicates devices with which the server 110 is consenting to receive communications.

At 608, the client device 104 may send a DNS request to the DNS 226 to resolve the domain of "consent.com" to an address associated with the domain. The DNS 226 may determine whether or not the server 110 has consented to communicating with the client device 104. For instance, the DNS 226 may determine whether the client device 104 and server 110 have created a consent contract 118, and/or if consent rules 240 received from the server 110 indicates consent to communicate with the client device 104.

At 610, the DNS 226 may validate the request and resolve "consent.com" into the IP address that is usable to reach the device associated with the domain "consent.com." For instance, the DNS 226 may use request data 302 from the client device 104 and consent rules 240 associated with the server 110 to create a consent contract 118.

At 612, the DNS 226 may provide an indication to the client device 104 that consent is allowed along with the IP address for the server 110 such that the client device 104 is able to communicate with the server 110. The client device 104 may then establish, at 614, a connection with the server 110 (e.g., TCP handshake to establish a TCP connection) over the network(s) 112.

Figure 7:
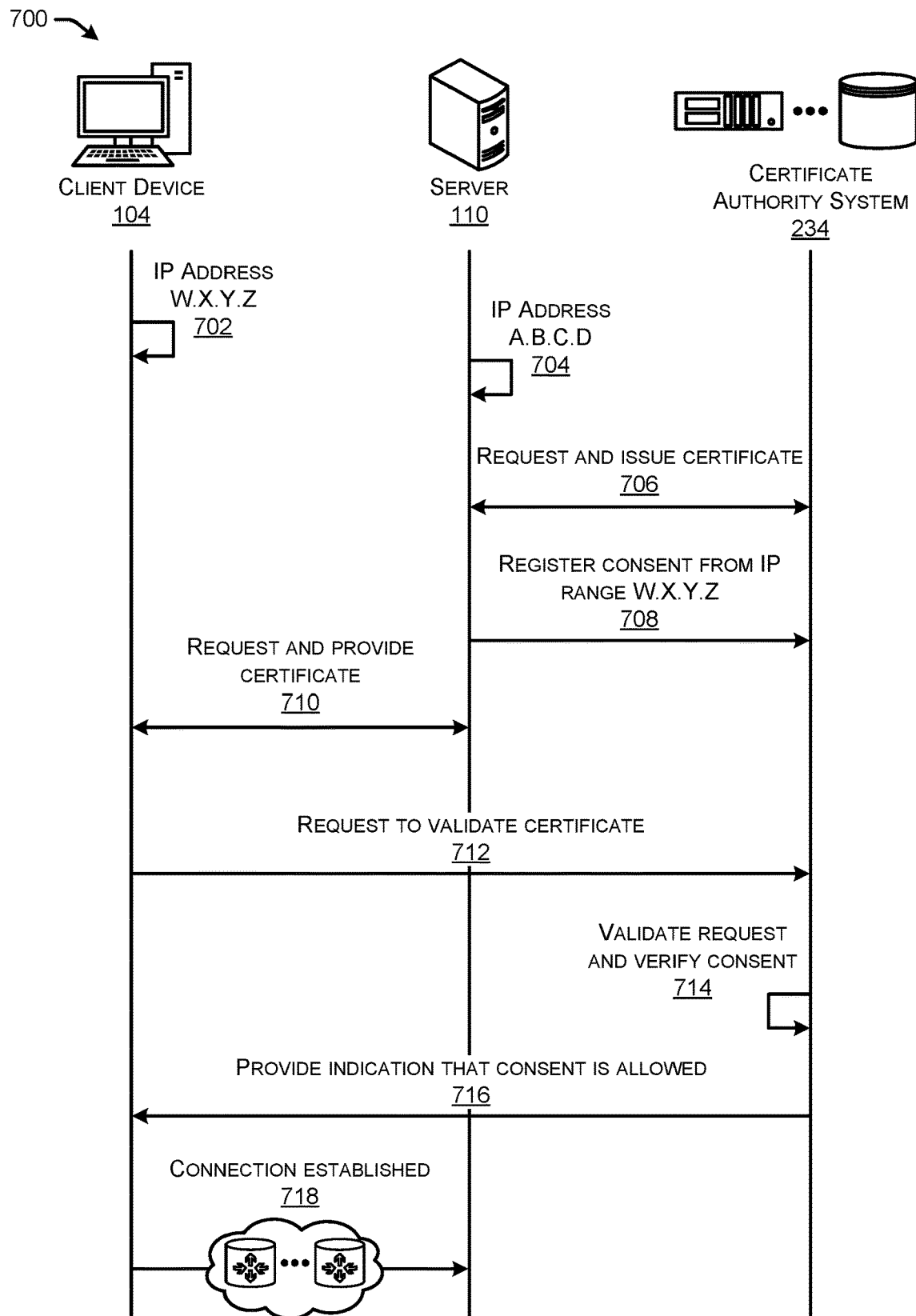
FIG. 7 illustrates a flow diagram of an example method for a Certificate Authority (CA) System to create and use consent contracts to allow or disallow network-based communications.

FIG. 7 illustrates a flow diagram of an example method 700 for a Certificate Authority (CA) System 232 to create and use consent contracts 118 to allow or disallow network-based communications.

At 702, the client device 104 may be assigned an IP address of "W.X.Y.Z" when the client device 104 joins a network and/or persistently by configuration of the hardware or software of the client device 104. Similarly, at 704 the server 110 may be assigned an IP address of "A.B.C.D" when the server 110 joins a network and/or persistently by configuration of the hardware or software of the server 110.

At 706, the server 110 may request a signed digital certificate, and the CA system 234 may issue a digital certificate to the server 110. At 708, the server 110 may register consent for devices from IP range "W.X.Y.Z" with the CA system 234. That is, the server 110 may send consent data 304 to the CA system 234 that indicates devices with which the server 110 is consenting to receive communications.

At 710, the client device 104 may request the digital certificate from the server 110, and the server 110 may provide the digital certificate to the client device. At 712, the client device 104 may send a request to the CA system 234 to validate the digital certificate of the server 110. The CA system 234 may determine whether or not the server 110 has consented to communicating with the client device 104. For instance, the CA system 234 may determine whether the client device 104 and server 110 have created a consent contract 118, and/or if consent rules 240 received from the server 110 indicates consent to communicate with the client device 104.

At 714, the CA system 234 may validate the digital certificate and verify that consent has been provided by the server 110 to communicate with the client device 104. For instance, the CA system 234 may use request data 302 from the client device 104 and consent rules 240 associated with the server 110 to create a consent contract 118.

At 716, the CA system 234 may provide an indication to the client device 104 that consent is allowed along with the IP address for the server 110 such that the client device 104 is able to communicate with the server 110. The client device 104 may then establish, at 718, a connection with the server 110 (e.g., TCP handshake to establish a TCP connection) over the network(s) 112.

Figure 8:
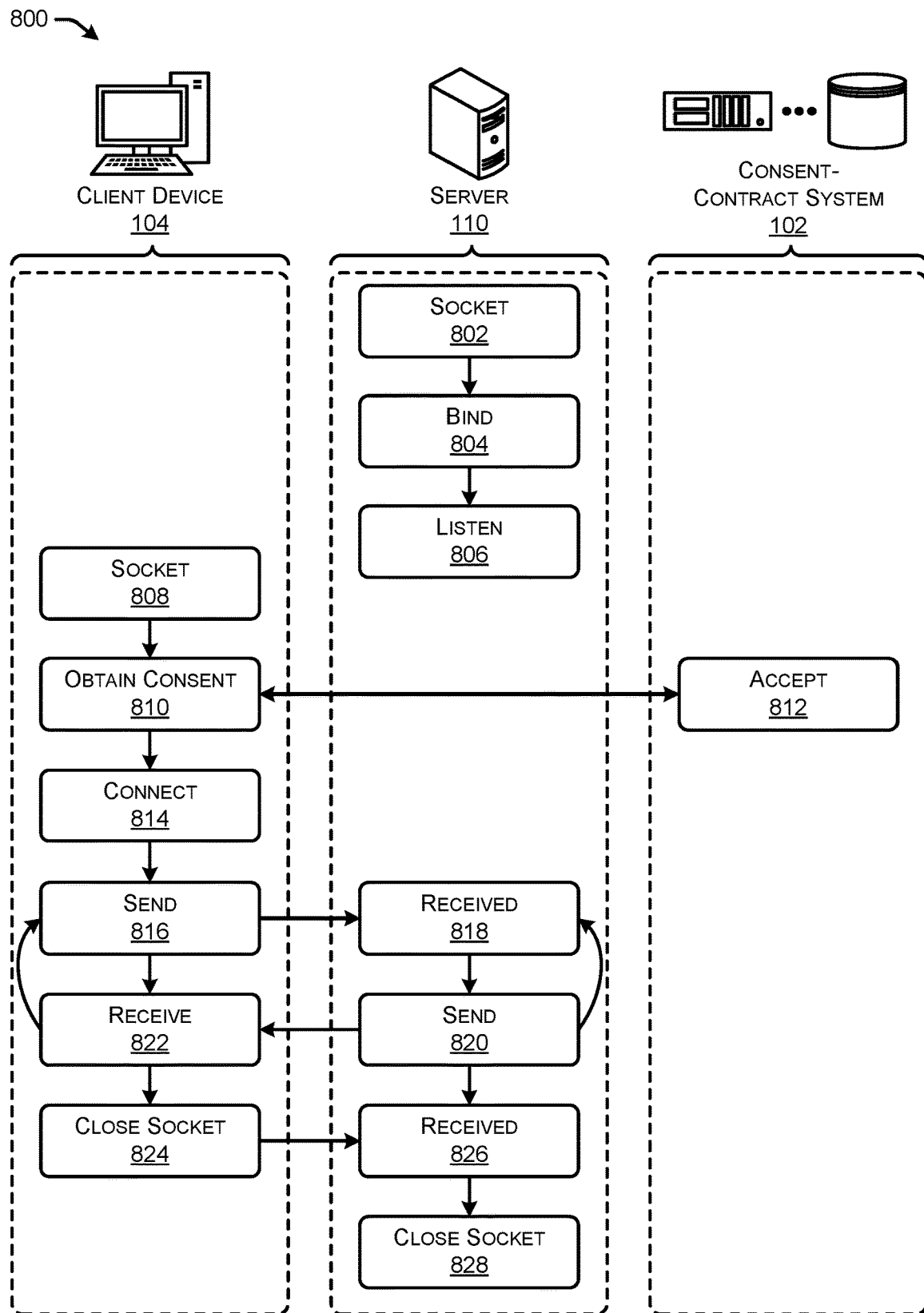
FIG. 8 illustrates a flow diagram of an example method for enforcing consent contracts using a socket on a client device.

FIG. 8 illustrates a flow diagram of an example method 800 for enforcing consent contracts 118 using a socket on a client device 104.

At 802, the server 110 may open a socket, such as an Internet socket, to provide the server 110 with access to TCP/IP transport protocols. The socket may be a stream socket to allow programs to communicate using TCP, a datagram socket to allow programs to communicate using UDP, an ICMP socket, and/or any other type of socket.

At 804, the server 110 may bind the socket to an address and port of the server 110 in order to receive data on the socket. At 806, the server 110 may begin listening for traffic that is to be received via the socket.

At 808, the client devices 104 may also open a socket (e.g., TCP, UDP, etc.). The sock that is opened on the client device 104 may be a particular type of socket that is implemented by an operating system of the client device 104, and when the socket is used, consent validation can happen when the client device 104 attempts to create the socket. For instance, at 810, the client device 104 may attempt to obtain consent at 810 from the consent-contract system 102. Thus, consent is built into opening the socket on the client device 104.

At 812, the consent-contract system 102 may accept the request (e.g., indicate that consent is found), and because consent is found, the client device 104 is permitted to connect 814 to the socket on the server 110.

At 816, the client device may send data to the server 110 over network(s) 112 using, for instance, TCP or UDP in an Internet example. At 818, the server 110 may receive the data, and respond by sending data to the client device at 820. The client device may receive the data 822, and may continue to send and receive data with the server 110 (if desired).

At 824, the client device 104 may close the socket, and the server 110 may receive, at 826, an indication that the client device 104 closed its socket. At 828, the server 110 may then close the socket as well and the communication session may end.

Figure 9:
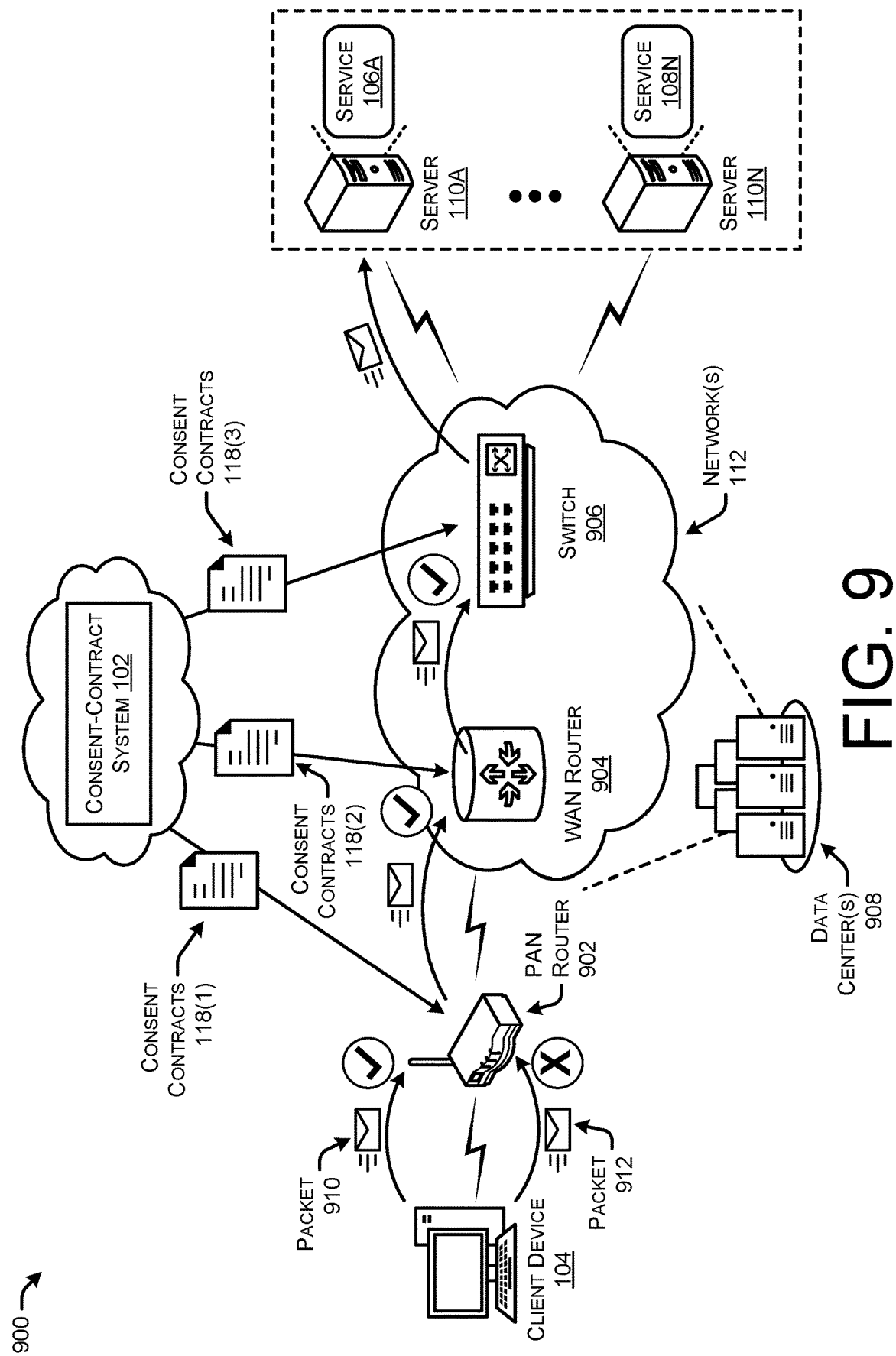
FIG. 9 illustrates a system-architecture diagram of an environment in which network devices enforce consent contracts to allow or disallow network-based communications at a network layer.

FIG. 9 illustrates a system-architecture diagram of an environment 900 in which network devices enforce consent contracts to allow or disallow network-based communications at a network layer.

As illustrated, the consent-contract system 102 may generate and distribute consent contracts 118 to network devices. Generally, the consent-contract system 102 indicate two or more devices that have consented to communicate with each other (e.g., send and receive network-based communications between each other). The consent-contract system 102 may send the consent contracts 118 to network devices, such as a PAN router 902 for the client device 104, a WAN router 904 located in the network(s) 112, and/or a switch 906 located in the network(s) 112. However, the network devices may be any type of device configured to communicate data through the networks, such as servers, switches, routers, hubs, bridges, gateways, modems, repeaters, access points, and/or any other type of computing device that may be running any type of software and/or virtualization technology. In some instances, that network devices 902, 904, and 906 may include, or be associated with NICs and smartNICs, FPGAs, ASICs, virtual machines, containers, and/or any other type of hardware-based or software-based network component.

The network devices may be configured to analyze received network-based communications, such as packets, and determine whether the destination devices for those packets have consented to receiving the packets using the consent contracts 118. For instance, the network devices 902, 904, and/or 906 may determine addresses for the client device 104 that sent a packet and for the server 110 for which the packet is intended. In the illustrative example, the client device 104 may send a packet that has a destination address corresponding to the IP address and port for server 110A, and the client device 104 may send a packet that has a destination address corresponding to the IP address and port for server 110N. As illustrated, the two packets may both hit PAN 902. Generally, it is more advantageous to have network devices enforcing consent contracts 118 near the sending devices (e.g., client devices 104) to evaluate the packets against the consent contracts 118 and drop unwanted packets early in the communication process.

In this example, the server 110A may have consented to receiving communications from the client device 104, and the consent-contract system 102 may have generated a consent contract 118 for the devices. However, the server 110N may not have agreed to receiving communications from the client device 104. In such an example, the PAN router 902 may use the consent contracts 118 to determine that the server 110A has consented to receiving the packet 910 from the client device 104, and send the packet 910 to WAN router 904, switch 906, and ultimately the server 110A. However, the PAN router 902 may use the consent contracts 118 to determine that the server 110N has not consented to receiving the packet 912 from the client device 104, and the PAN router 902 may drop the packet 912.

Figure 10:
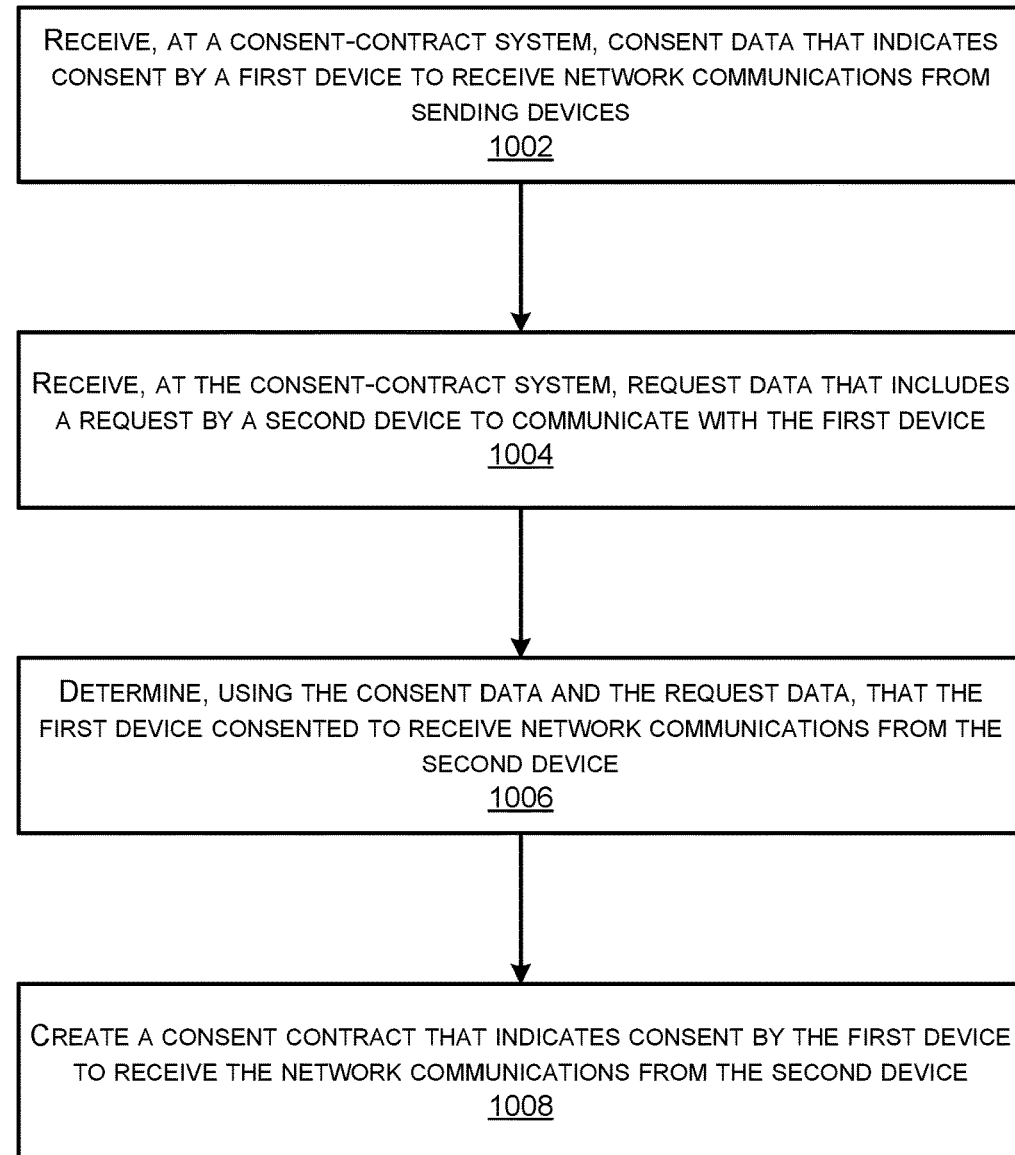
FIG. 10 illustrates a flow diagram of an example method for creating consent contracts usable to allow or disallow network-based communications between devices.
Figure 11:
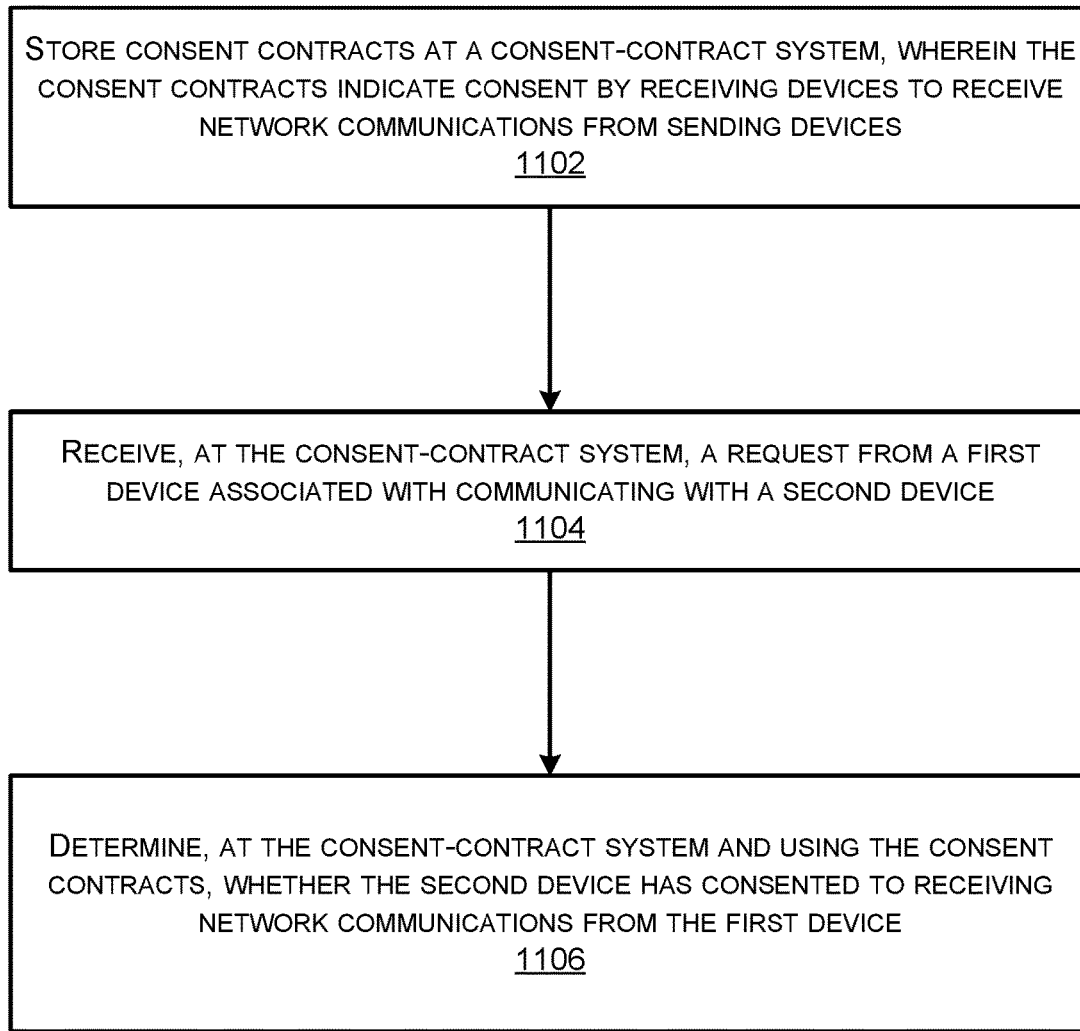
FIG. 11 illustrates a flow diagram of an example method for managing consent contracts for network-based communications between devices.

FIGS. 10-12 illustrate flow diagrams of example methods 1000, 1100, and 1200 that illustrate aspects of the functions performed at least partly by the devices described in FIGS. 10-12, such as the client device 104, the consent-contract system 102, the network devices 114, the servers 110, and so forth. The logical operations described herein with respect to FIGS. 10-12 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 10-12 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some instances, the steps of methods 1000, 1100, and/or 1200 may be performed by a device and/or a system of devices that includes one or more processors and one or more non-transitory computer-readable media storing computer-executable instructions that, when executed by the one or more processors, cause the one or more processors to perform operations of methods 1000, 1100, and/or 1200.

FIG. 10 illustrates a flow diagram of an example method 1000 for creating consent contracts 118 usable to allow or disallow network-based communications between devices.

At 1002, a consent-contract system 102 may receive consent data that indicates consent by a first device to receive network communications from sending devices. For instance, the consent data 304 may indicate client devices 104 that are permitted to communicate with a server 110 and/or server 106.

At 1004, the consent-contract system 102 may receive request data 302 that includes a request by a second device to communicate with the first device. For instance, the client device 104 may send request data 302 indicating a request to communicate with the server 110.

At 1006, the consent-contract system 102 may determine, using the consent data and the request data, that the first device consented to receive network communications from the second device. For instance, the consent-contract system 102 may determine that the server 110 has consented to communicating with the client device 104 based on an address of the client device 104 and/or the communication type/purpose.

At 1008, the consent-contract system 102 may create a consent contract 118 that indicates consent by the first device to receive the network communications from the second device. The consent-contract system 102 may then store the consent contract 118 locally and/or distribute the consent contract 118 to network devices 114.

In some instances, the method 1000 may further include sending the consent contract to a network device that is disposed in a network through which the network communications are to be communicated, determining that a threshold period of time has elapsed from when the consent contract was created, and sending the network device an indication that the consent contract is invalid based at least in part on the threshold period of time elapsing.

In some examples, consent may be established using other mechanisms, such as using permissions granted to entities. For instance, permissions may be granted to devices that have particular identities. Devices may be validated, authorized, and/or otherwise verified by a trusted party (e.g., an identity provider or other trusted provider) that issues identities to the devices. The identities may be provided with different authorizations based on the identity. For example, some identities may have different permissions, similar to security levels, where they are given consent to talk to additional devices, less devices, different devices, and/or any combination thereof. Devices can provide consent to the consent-contract system to receive communications based on the identity issued to requesting devices. In this way, devices may contact the contract-contract system and provide an indication of their identity (or other indication of permissions), and the consent-contract system may determine whether receiving devices to which the communications are intended have consented to communicating with the identity or permissions of the requesting device. Thus, using identities and/or other indications of permissions, consent-contract systems may determine consent and create consent contracts.

In such examples, the method 1000 may further include receiving, from the second device, first data indicating a set of permissions granted to the second device, and determining that the first device has provided second data indicating consent to receive receiving network communications from devices with the set of permissions.

FIG. 11 illustrates a flow diagram of an example method 1100 for managing consent contracts 118 for network-based communications between devices.

At 1102, a consent-contract system 102 may store consent contracts 118 in a storage location, and the consent contracts 118 generally indicate consent by receiving devices to receive network communications from sending devices.

At 1104, the consent-contract system 102 may receive a request from a first device associated with communicating with a second device. For instance, the consent-contract system 102 may receive a request from a client device 104 to communicate with a server 110.

At 1106, the consent-contract system 102 may determine, using the consent contracts 118 whether the second device has consented to receiving network communications from the first device.

In some instances, the consent-contract system is a DNS provider, and receiving the request from the first device includes receiving a DNS request to translate a domain name into an IP address associated with the second device. In other examples, the consent-contract system is a certificate authority (CA) system, and receiving the request from the first device includes receiving a request to validate a signed certificate associated with the second device.

FIG. 12 illustrates a flow diagram of an example method 1200 for enforcing consent contracts 118 to allow or disallow network-based communications between devices.

At 1202, a network device may receive consent contracts indicating consent by first devices to receive network communications from second devices. The network device 114 may comprise one or more of a network router, a network switch, a network modem, a network hub, a network gateway, or a network access point. For instance, the network device 114 may receive consent contracts 118 from a consent-contract system 102, and the consent contracts 118 may indicate whether servers 110 have consented to receive network communications from client devices 104 (however, the techniques are applicable to any communication device).

At 1204, the network device may receive a packet that is to be sent over the network. For instance, the PAN router 902, WAN router 904, switch 906, and/or any other network device 114, may receive a packet from the client device 104.

At 1206, the network device may identify, from the packet, first data indicating a first device to which the packet is being sent and second data indicating a second device from which the packet was sent. For instance, the network device 114 may identify, from the packet, an IP address for the server 110 and an IP address for the client device 104 (although any type of address or indicating may be used, such as MAC addresses). In some instances, the first data and second data may be other types of indicators for the devices, such as indications of identities of users of the devices, a nonce, a signature, and/or any other data usable to convey an indication of a device and/or user of a device.

At 1208, the network device may determine, using the first data and the second data, whether a consent contract of the consent contracts indicate that the first device has consented to receiving the packet from the second device. For instance, the network device 114 may determine if at least one of the consent contracts 118 indicates a mapping between the IP addresses that indicate consent for the server 110 to receive communications from the client device 104.

In some instances, the method 1200 includes determining that the consent contracts indicate that the first device has consented to receiving the packet from the second device, and sending the packet to a next-hop network device in the network such that the packet is being transmitted to the first device. In other examples, the method 1200 includes determining that the consent contracts indicate that the first device has not consented to receiving the packet from the second device, and dropping the packet.

In some instances, the packet is a synchronize packet usable to establish a Transport Control Protocol (TCP) connection, and the network device is located in a Wide Area Network (WAN). In some examples, the consent contracts 118 are received from a Domain Name System (DNS) provider configured to create the consent contracts, or a Certificate Authority (CA) systems configured to create the consent contracts.

Figure 13:
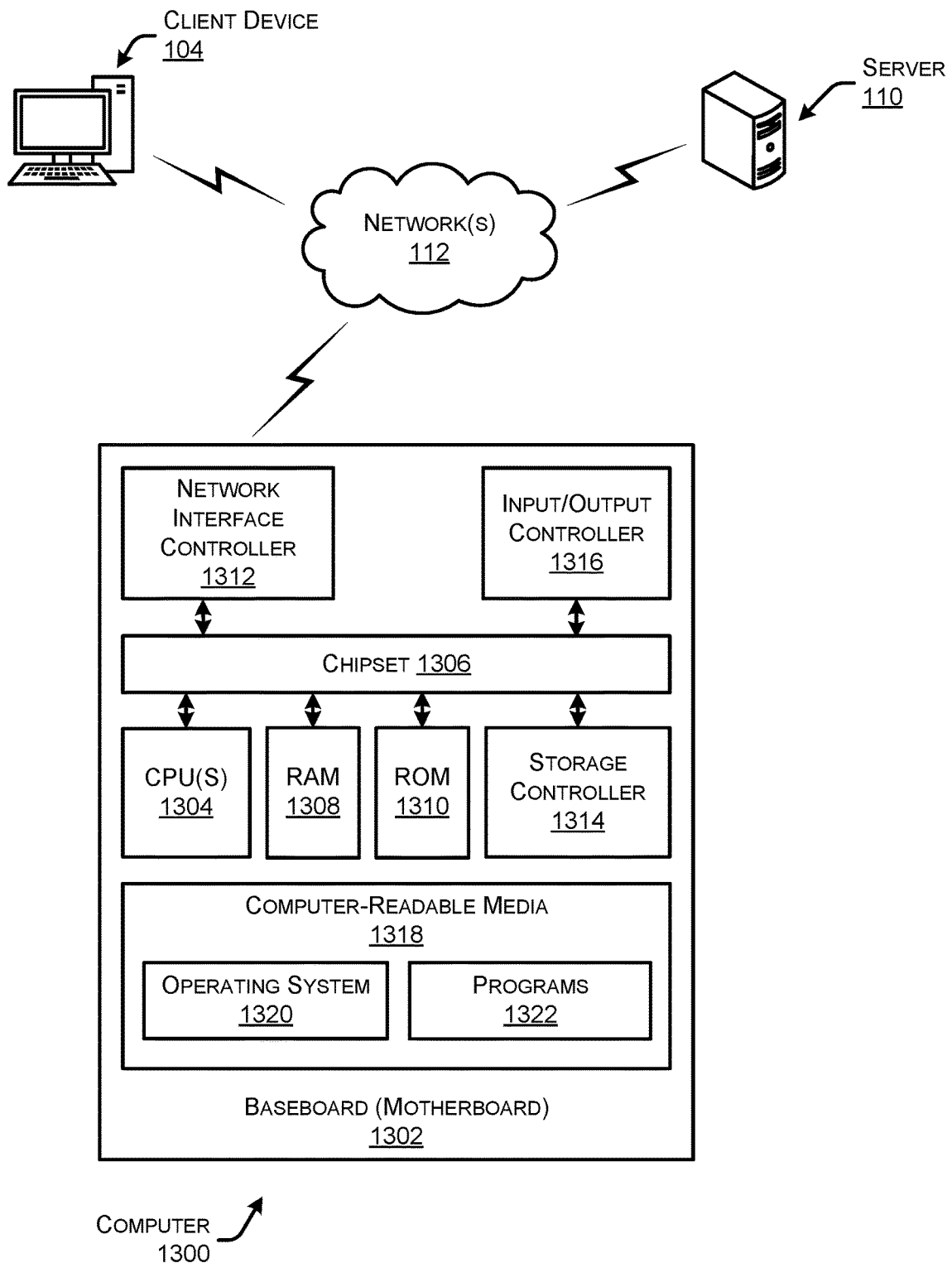
FIG. 13 is a computer architecture diagram showing an example computer architecture for a device capable of executing program components that can be utilized to implement aspects of the various technologies presented herein.

FIG. 13 shows an example computer architecture for a device capable of executing program components for implementing the functionality described above. The computer architecture shown in FIG. 13 illustrates any type of computer 1300, such as a conventional server computer, workstation, desktop computer, laptop, tablet, network appliance, e-reader, smartphone, or other computing device, and can be utilized to execute any of the software components presented herein. The computer 1300 may, in some examples, correspond to a one or more devices that comprise the consent-contract system 102, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 1300 includes a baseboard 1302, or "motherboard," which is a printed circuit board to which a multitude of components or devices can be connected by way of a system bus or other electrical communication paths. In one illustrative configuration, one or more central processing units ("CPUs") 1304 operate in conjunction with a chipset 1306. The CPUs 1304 can be standard programmable processors that perform arithmetic and logical operations necessary for the operation of the computer 1300.

The CPUs 1304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 can provide an interface to a RAM 1308, used as the main memory in the computer 1300. The chipset 1306 can further provide an interface to a computer-readable storage medium such as a read-only memory ("ROM") 1310 or non-volatile RAM ("NVRAM") for storing basic routines that help to startup the computer 1300 and to transfer information between the various components and devices. The ROM 1310 or NVRAM can also store other software components necessary for the operation of the computer 1300 in accordance with the configurations described herein.

The computer 1300 can operate in a networked environment using logical connections to remote computing devices and computer systems through a network, such as the network 112. The chipset 1306 can include functionality for providing network connectivity through a NIC 1312, such as a gigabit Ethernet adapter. The NIC 1312 is capable of connecting the computer 1300 to other computing devices over the network 112. It should be appreciated that multiple NICs 1312 can be present in the computer 1300, connecting the computer to other types of networks and remote computer systems.

The computer 1300 can be connected to a storage device 1318 that provides non-volatile storage for the computer. The storage device 1318 can store an operating system 1320, programs 1322, and data, which have been described in greater detail herein. The storage device 1318 can be connected to the computer 1300 through a storage controller 1314 connected to the chipset 1306. The storage device 1318 can consist of one or more physical storage units. The storage controller 1314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1300 can store data on the storage device 1318 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1318 is characterized as primary or secondary storage, and the like.

For example, the computer 1300 can store information to the storage device 1318 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 can further read information from the storage device 1318 by detecting the physical states or characteristics of one or more particular locations within the physical storage units.

In addition to the mass storage device 1318 described above, the computer 1300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1300. In some examples, the operations performed by the consent-contract component 102, the network devices 114, and or any components included therein, may be supported by one or more devices similar to computer 1300. Stated otherwise, some or all of the operations performed consent-contract system 102 and/ or the network devices 114, and or any components included therein, may be performed by one or more computer devices 1300.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1318 can store an operating system 1320 utilized to control the operation of the computer 1300. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1318 can store other system or application programs and data utilized by the computer 1300.

In one embodiment, the storage device 1318 or other computer-readable storage media is encoded with computer-executable instructions which, when loaded into the computer 1300, transform the computer from a general-purpose computing system into a special-purpose computer capable of implementing the embodiments described herein. These computer-executable instructions transform the computer 1300 by specifying how the CPUs 1304 transition between states, as described above. According to one embodiment, the computer 1300 has access to computer-readable storage media storing computer-executable instructions which, when executed by the computer 1300, perform the various processes described above with regard to FIGS. 1-12. The computer 1300 can also include computer-readable storage media having instructions stored thereupon for performing any of the other computer-implemented operations described herein.

The computer 1300 can also include one or more input/output controllers 1316 for receiving and processing input from a number of input devices, such as a keyboard, a mouse, a touchpad, a touch screen, an electronic stylus, or other type of input device. Similarly, an input/output controller 1316 can provide output to a display, such as a computer monitor, a flat-panel display, a digital projector, a printer, or other type of output device. It will be appreciated that the computer 1300 might not include all of the components shown in FIG. 2, can include other components that are not explicitly shown in FIG. 13, or might utilize an architecture completely different than that shown in FIG. 13.

As described herein, the computer 1300 may comprise one or more of a consent-contract system 102, the network devices 114, and/or any other device. The computer 1300 may include one or more hardware processors 1304 (processors) configured to execute one or more stored instructions. The processor(s) 1304 may comprise one or more cores. Further, the computer 1300 may include one or more network interfaces configured to provide communications between the computer 1300 and other devices, such as the communications described herein as being performed by the client devices 104, consent-contract system 102, and/or the network devices 114. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. The programs 1322 may comprise any type of programs or processes to perform the techniques described in this disclosure.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for managing consent contracts for network communications, the method comprising:
   receiving, by a Domain Name System (DNS) provider and from a plurality of receiving devices, consent data comprising conditions associated with receiving the network communications from one or more sending devices;
   in response to receiving the consent data, generating, by the DNS provider, the consent contracts for the plurality of receiving devices, wherein the consent contract indicates that a receiving device of the plurality of receiving devices has consented to receiving the network communications from one or more particular sending devices and is valid for a period of time;
   storing, by DNS provider, the consent contracts;
   receiving, from a first device, a DNS request at a DNS server of the DNS provider, the DNS request indicating a request to translate a domain name into an Internet Protocol (IP) address associated with a second device;
   determining, at the DNS server, that a particular consent contract indicates that the second device has consented to receiving the network communications from the first device, the particular consent contract limiting the network communications to a particular communication type or a particular purpose associated with the network communication;
   in response to determining that the particular consent contract is valid and indicates that the second device has consented to receiving the network communications of the particular communication type or the particular purpose from the first device:
      determining, at the DNS server, that the IP address corresponds to the domain name; and
      sending, from the DNS server, a DNS response to the first device that includes the IP address; or
   in response to determining that the particular consent contract is invalid or indicates that the second device has not consented to receiving the network communications of the particular type or the particular purpose from the first device:
      refraining, by the DNS server, from sending the IP address to the first device; or
      sending, from the DNS server, a response to the first device indicating a rejection of the DNS request.

2. The method of claim 1, further comprising:
   receiving, from the first device, first data indicating a set of permissions granted to the first device; and
   determining that the second device has provided second data indicating consent to receive the network communications from devices with the set of permissions.

3. The method of claim 1, wherein the consent data further comprises one or more of:
   a first range of addresses associated with the sending devices with which the second device has consented to communicating;
   a second range of addresses associated with the sending devices with which the second device has restricted from communicating;
   a first indication that that the second device consents to communicate with the sending devices that desire to send the network communications of the particular communication type; or
   a second indication that that the second device consents to communicate with the sending devices that desire to establish a connection of a particular connection type.

4. The method of claim 1, further comprising:
   receiving the consent data indicating that the second device has consented to receiving the type of network communication comprising layer-3 or layer-4 traffic from the first device; and
   generating the particular consent contract to allow the network communications where the network communications are the layer-3 or the layer-4 traffic from the first device.

5. The method of claim 1, wherein:
   the particular consent contract includes a mapping between a first device identifier associated with the first device and a second device identifier associated with the second device; and
   determining that the particular consent contract indicates that the second device has consented to receiving the network communications from the first device includes:
      determining that the DNS request includes the first device identifier;
      using the first device identifier, identifying the mapping; and
      determining, using the mapping, that the first device identifier is mapped to the second device identifier.

6. The method of claim 1, further comprising:
   receiving consent data indicating that the second device has consented to receiving the type of network communication comprising layer-5, layer-6, or layer-7 traffic from the first device; and
   generating the particular consent contract using the consent data.

7. A certificate authority (CA) system comprising:
   one or more processors; and
   one or more non-transitory computer-readable media storing computer-executable instructions that, when executed by the one or more processors, cause the one or more processors to perform operations comprising:
      issuing a signed certificate to a server;

receiving consent data associated with the server, the consent data comprising conditions associated with the server receiving network communications;

in response to receiving the consent data, generating consent contracts for the server, wherein the consent contracts indicate that the server has agreed to receive the network communications of a particular communication type from one or more particular sending devices;

receiving, from a client device, a request to validate the signed certificate;

determining, by the CA system and using the consent contracts, whether the client device is permitted to send the network communications to the server and whether the network communications are of the particular communication type;

in response to determining that the client device is permitted to send the network communications to the server and that the network communications are of the particular communication type:
- validating the signed certificate for the client device; and
- notifying the client device that the signed certificate is valid; or in response to determining that the client device is not permitted to send the network communications to the server:
- refraining from validating the signed certificate; or
- refraining from notifying the client device that the signed certificate is valid.

8. The CA system of claim 7, the operations further comprising:
  receiving, from the client device, first data indicating a set of permissions granted to the client device; and
  determining that the server has provided second data indicating consent to receive receiving the network communications from devices with the set of permissions.

9. The CA system of claim 7, the consent data further comprising at least one of:
  a first range of addresses associated with devices with which the server has consented to communicating;
  a second range of addresses associated with devices with which the server has restricted from communicating;
  a first indication that that the server consents to communicate with devices that desire to send the network communications of the particular communication type;
  a second indication that that the server consents to communicate with devices that desire to establish a connection of a particular connection type; or
  a third indication that that the second device consents to communicate with devices that desire to send the network communications for a particular purpose.

* * * * *